United States Patent
Niwa et al.

(10) Patent No.: US 10,087,875 B2
(45) Date of Patent: Oct. 2, 2018

(54) FUEL INJECTION VALVE CONTROL DEVICE

(71) Applicant: DENSO CORPORATION, Kariya, Aichi-pref (JP)

(72) Inventors: Masayuki Niwa, Nishio (JP); Noritsugu Kato, Kariya (JP); Makoto Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/543,741

(22) PCT Filed: Dec. 22, 2015

(86) PCT No.: PCT/JP2015/006370
§ 371 (c)(1),
(2) Date: Jul. 14, 2017

(87) PCT Pub. No.: WO2016/116993
PCT Pub. Date: Jul. 28, 2016

(65) Prior Publication Data
US 2018/0010546 A1  Jan. 11, 2018

(30) Foreign Application Priority Data
Jan. 20, 2015  (JP) ................. 2015-008331

(51) Int. Cl.
F02D 41/40 (2006.01)
F02M 51/06 (2006.01)
(52) U.S. Cl.
CPC ............. F02D 41/40 (2013.01); F02M 51/06 (2013.01)
(58) Field of Classification Search
CPC ........ F02D 41/20; F02D 41/40; F02D 41/124; F02M 51/06
See application file for complete search history.

(56) References Cited

U.S. PATENT DOCUMENTS 8,100,345 B2 * 1/2012 Hotta et al. .......... F02M 41/124
239/533.2
2013/0192562 A1  8/2013  Matsumura

FOREIGN PATENT DOCUMENTS

JP  2009138639 A  *  6/2009  ............. F02D 41/20
JP  2013-44250  3/2013
JP  2013-181494  9/2013

OTHER PUBLICATIONS

International Search Report for PCT/JP2015/006370, dated Mar. 29, 2016, 4 pages.

* cited by examiner

Primary Examiner — Hieu T Vo
(74) Attorney, Agent, or Firm — Nixon & Vanderhye P.C.

(57) ABSTRACT

A fuel injection valve control device controlling a fuel injection valve that injects a fuel into a combustion chamber includes an operation-condition calculation portion that calculates a fuel injection condition of the fuel injection valve based on a crank angle detected by a crank angle sensor that detects the crank angle of an engine, a current-waveform setting portion that sets a current waveform of a current supplied to the fuel injection valve on the basis of the fuel injection condition calculated by the operation-condition calculation portion, and so on. The current-waveform setting portion sets the current waveform so as to set a temporal change of a pickup current of a needle provided in the fuel injection valve to be equal to or less than a predetermined reference value when a fuel injection start timing is equal to or more than 180 degrees BTDC. The current-waveform setting portion sets the current waveform so as to set a temporal change of the pickup current of the needle to be more than the predetermined reference value when the fuel injection start timing is smaller than 180 degrees BTDC.

8 Claims, 17 Drawing Sheets

(a)

(b)

(a)

(b)

(a)

(b)

(a)

(b)

(a)

(b)

FUEL INJECTION VALVE CONTROL DEVICE

CROSS-REFERENCE TO RELATED APPLICATION

This application is the U.S. national phase of International Application No. PCT/JP2015/006370 filed Dec. 22, 2015, which designated the U.S. and claims priority to Japanese Patent Application No. 2015-8331 filed on Jan. 20, 2015, the entire contents of each of which are incorporated herein by reference.

TECHNICAL FIELD

The present disclosure relates to a fuel injection valve control device that injects a fuel into a combustion chamber of an internal combustion engine (hereinafter, referred to as an "engine").

BACKGROUND ART

Up to now, a fuel injection valve control device which controls opening and closing of an injection hole of the fuel injection valve that opens and closes an injection hole of a housing by a reciprocating movement of a needle and injects a fuel in the housing has been known. For example, Patent Literature 1 discloses a fuel injection valve control device which includes a PM reference timing calculation portion that calculates a fuel injection timing at which the amount of particulate matter discharged from an engine is minimized, a particulate matter amount detection portion that detects the amount of particulate matter contained in an exhaust gas, and an injection timing changing portion that is capable of changing a fuel injection timing of a fuel injection valve. In the fuel injection valve control device, the fuel injection timing is changed so as to improve a fuel efficiency on the basis of the fuel injection timing calculated by the PM reference timing calculation portion in a range where the amount of particulate matter detected by the particulate matter amount detection portion does not exceed a predetermined upper limit value.

However, in the fuel injection valve control device disclosed in Patent Literature 1, because only the injection timing is changed on the basis of the amount of the particulate matter detected by the particulate matter amount detection portion, the timing changeable for the purpose of improving the fuel efficiency is relatively narrow. For that reason, the fuel efficiency cannot be sufficiently improved. In addition, because a robustness of the amount of particulate matter produced by a fuel spray variation between combustion cycles of the engine is low, there is a risk that the amount of particulate matter produced increases if a fuel injection condition changes.

PRIOR ART LITERATURES

Patent Literature

Patent Literature 1: JP 2013-44250 A

SUMMARY OF INVENTION

It is an object of the present disclosure to provide a fuel injection valve control device which improves a fuel efficiency while reducing the amount of particulate matter produced.

The present disclosure is directed to a fuel injection valve control device which controls opening and closing of an injection hole of the fuel injection valve having a needle that abuts against or separates from a valve seat formed around the injection hole of a housing and a drive portion that drives the needle so that the needle and the valve seat are separated from each other when a current is supplied to the drive portion. The fuel injection valve control device according to the present disclosure includes an operation-state detection portion that detects an operation state of an internal combustion engine, an injection-condition calculation portion that calculates a fuel injection condition of the fuel injection value on the basis of an operation state of the internal combustion engine detected by the operation-state detection portion, a current-waveform setting portion that sets a current waveform of a current to be supplied to the drive portion on the basis of the fuel injection condition calculated by the injection-condition calculation portion, and a current supply portion that supplies a current to the drive portion on the basis of the current waveform set by the current-waveform setting portion.

According to the fuel injection valve control device according to the present disclosure, the current-waveform setting portion sets the current waveform so that a travel speed of the needle in a valve opening direction is equal to or lower than a reference travel speed when a crank angle of the internal combustion engine is equal to or more than a predetermined crank angle, and sets the current waveform so that the travel speed of the needle in the valve opening direction is higher than the reference travel speed when the crank angle of the internal combustion engine is less than the predetermined crank angle.

In the fuel injection valve control device according to the present disclosure, the current-waveform setting portion changes the travel speed of the needle in the valve opening direction according to the crank angle of the internal combustion engine. When the crank angle of the internal combustion engine is equal to or more than the predetermined crank angle, the current-waveform setting portion sets the current waveform so that the travel speed of the needle in the valve opening direction is equal to or lower than the reference travel speed. When the crank angle of the internal combustion engine is less than the predetermined crank angle, the current-waveform setting portion sets the current waveform so that the travel speed of the needle in the valve opening direction becomes higher than the reference travel speed. In this example, the crank angle "more than the predetermined crank angle" means a crank angle on an advance side with respect to the predetermined crank angle. The "reference travel speed" means the travel speed of the needle in the valve opening direction at the predetermined crank angle.

In the fuel injection valve control device according to the present disclosure, a current is supplied from the current supply portion to the drive portion of the fuel injection valve on the basis of the set current waveform. As a result, from the viewpoint of a spray arrival distance, which is a distance by which the fuel injected in the fuel injection of the fuel injection valve into an atomized state is reachable, when the crank angle of the internal combustion engine is equal to or more than the predetermined crank angle, the fuel injection valve performs the fuel injection so that the spray arrival distance immediately after the injection starts is shorter, but the spray arrival distance immediately after the spray has been completed with a relatively long spray time is long. When the crank angle of the internal combustion engine is equal to or less than the predetermined crank angle, the fuel injection valve performs the fuel injection so that the spray arrival distance immediately after the injection starts is longer, but the spray arrival distance immediately after the spray has been completed with a relatively short spray time is short. As a result, the amount of fuel colliding with an inner wall of the internal combustion engine forming a combustion chamber such as an end face of a piston can be reduced. Therefore, the fuel injection valve control device according to the present disclosure can increase a timing when the fuel can be injected and improve the fuel efficiency while reducing a fuel adhesion to the inner wall of the internal combustion engine to suppress the generation of particulate matter.

BRIEF DESCRIPTION OF DRAWINGS

The above-described purpose and the other purposes of the present disclosure, as well as the features and advantages of the present disclosure, will be further clarified in the following detailed description and with reference to accompanying drawings.

EMBODIMENT FOR CARRYING OUT INVENTION

Hereinafter, embodiments of the present disclosure will be described with reference to drawings.

First Embodiment

A fuel injection valve control device according to a first embodiment of the present disclosure will be described with reference to FIGS. 1 to 7. A fuel injection valve control device 1 controls a fuel injection valve 10 that is opened by a supplied current and injects a fuel into a combustion chamber 110 of an engine 11.

Figure 1:
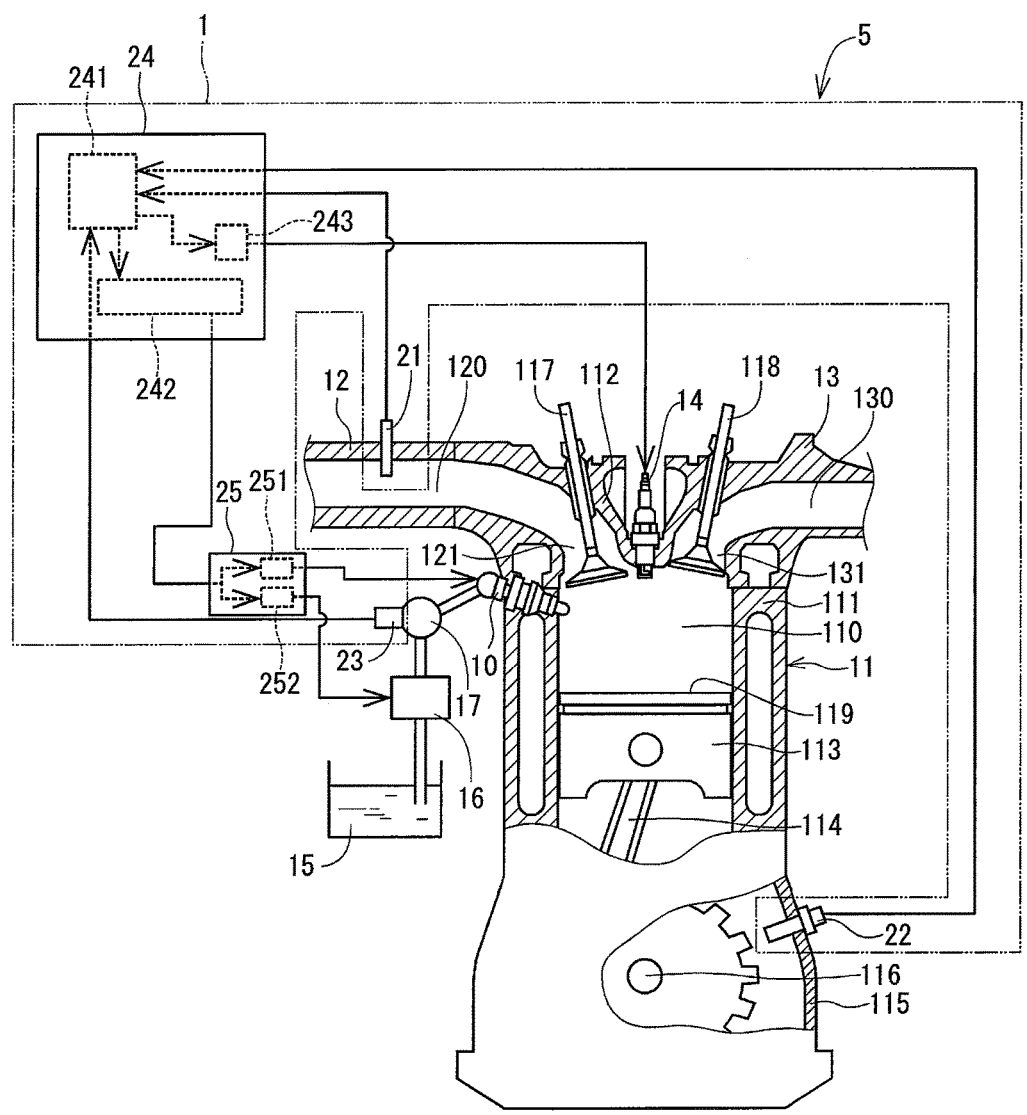
FIG. 1 is a schematic diagram of an internal combustion engine used in a fuel injection valve control device according to a first embodiment of the present disclosure.

First, an engine system 5 provided with the fuel injection valve control device 1 will be described with reference to FIG. 1. The engine system 5 includes the engine 11, an intake system 12, an exhaust system 13, an ignition plug 14, a fuel tank 15, a fuel pump 16, a fuel delivery pipe 17, the fuel injection valve 10, the fuel injection valve control device 1, and so on.

The engine 11 includes a cylinder 111, a cylinder head 112, a piston 113, a connecting rod 114, a crank case 115, a crankshaft 116, and so on.

The piston 113 is housed to reciprocate in the combustion chamber 110 partitioned by the cylinder 111 and the cylinder head 112. The piston 113 is coupled with the crankshaft 116 that is rotatably housed in the crank case 115 through the connecting rod 114.

The intake system 12 has an intake air passage 120 in which an atmosphere flows. The intake air passage 120 is communicatable with the combustion chamber 110 through an intake port 121 provided in the cylinder head 112. The intake port 121 is opened and closed by an intake valve 117.

The exhaust system 13 has an exhaust gas passage 130 in which a combustion exhaust gas flows, and the combustion exhaust gas is generated by combustion of the fuel in the combustion chamber 110. The exhaust gas passage 130 is communicatable with the combustion chamber 110 through an exhaust port 131 provided in the cylinder head 112. The exhaust port 131 is opened and closed by an exhaust valve 118.

The ignition plug 14 is disposed in the cylinder head 112. The ignition plug 14 ignites an air-fuel mixture of an air introduced into the combustion chamber 110 with a fuel injected by the fuel injection valve 10.

The fuel tank 15 stores the fuel which will be injected into the combustion chamber 110.

The fuel pump 16 boosts the fuel in the fuel tank 15 up to a pressure injectable by the fuel injection valve 10, and discharges the boosted fuel.

The fuel delivery pipe 17 temporarily stores the fuel boosted by the fuel pump 16, and keeps a constant pressure of the fuel which will be injected by the fuel injection valve 10.

The fuel injection valve 10 is disposed in the cylinder 111. When the fuel injection valve control device 1 supplies a current to the fuel injection valve 10, the fuel injection valve 10 injects the fuel into the combustion chamber 110. A detailed configuration of the fuel injection valve 10 will be described later.

The fuel injection valve control device 1 includes an intake air pressure sensor 21, a crank angle sensor 22, an injection pressure sensor 23, an electronic control portion (hereinafter referred to as "ECU") 24, a fuel injection control portion 25 as a "current supply portion", and so on. The intake air pressure sensor 21, the crank angle sensor 22, and the injection pressure sensor 23 correspond to an "operation-state detection portion".

The intake air pressure sensor 21 is disposed in the intake system 12. The intake air pressure sensor 21 is electrically connected to the ECU 24. The intake air pressure sensor 21 detects a pressure of a gas flowing in the intake air passage 120. The intake air pressure sensor 21 outputs an electric signal based on a detected pressure to the ECU 24.

The crank angle sensor 22 is disposed in the crank case 115, and the crank angle sensor 22 is electrically connected to the ECU 24. The crank angle sensor 22 detects a rotation angle of the crankshaft 116. The crank angle sensor 22 outputs the electric signal based on the detected rotation angle to the ECU 24.

The injection pressure sensor 23 is disposed in the fuel delivery pipe 17. The injection pressure sensor 23 is electrically connected with the ECU 24. The injection pressure sensor 23 detects a pressure of the fuel in the fuel delivery pipe 17. The injection pressure sensor 23 outputs the electric signal based on the detected pressure of the fuel to the ECU 24.

The ECU 24 is a compact computer having a CPU as an arithmetic portion, a ROM and a RAM as a storage portion, and so on. The ECU 24 includes an operation-condition calculation portion 241 as an "injection-condition calculation portion", a fuel-injection setting portion 242 as a "current-waveform setting portion", an ignition plug control portion 243, and so on.

The operation-condition calculation portion 241 is electrically connected with the intake air pressure sensor 21, the crank angle sensor 22, and the injection pressure sensor 23. The operation-condition calculation portion 241 calculates the fuel injection condition under which the fuel injection valve 10 injects the fuel on the basis of the electric signals output by the intake air pressure sensor 21, the crank angle sensor 22, and the injection pressure sensor 23, and calculates an ignition timing of the ignition plug 14.

The fuel-injection setting portion 242 sets a current waveform including information such as a magnitude of the current to be supplied to the fuel injection valve 10, a timing to supply the current, and so on, on the basis of the fuel injection condition calculated by the operation-condition calculation portion 241, and sets the operation condition of the fuel pump 16.

The ignition plug control portion 243 ignites the ignition plug 14 on the basis of the ignition timing calculated by the operation-condition calculation portion 241.

The fuel injection control portion 25 is electrically connected with the fuel-injection setting portion 242. The fuel injection control portion 25 includes a valve control portion 251 and a pump control portion 252 as a "current supply portion".

The valve control portion 251 is electrically connected with the fuel injection valve 10. The valve control portion 251 supplies the current to the fuel injection valve 10 on the basis of a current waveform output by the fuel-injection setting portion 242.

The pump control portion 252 is electrically connected with the fuel pump 16. The pump control portion 252 outputs a current so as to control the operation of the fuel pump 16 on the basis of the operation condition output by the fuel-injection setting portion 242. The pump control portion 252 and the fuel pump 16 correspond to an "injection-pressure changing portion".

Figure 2:
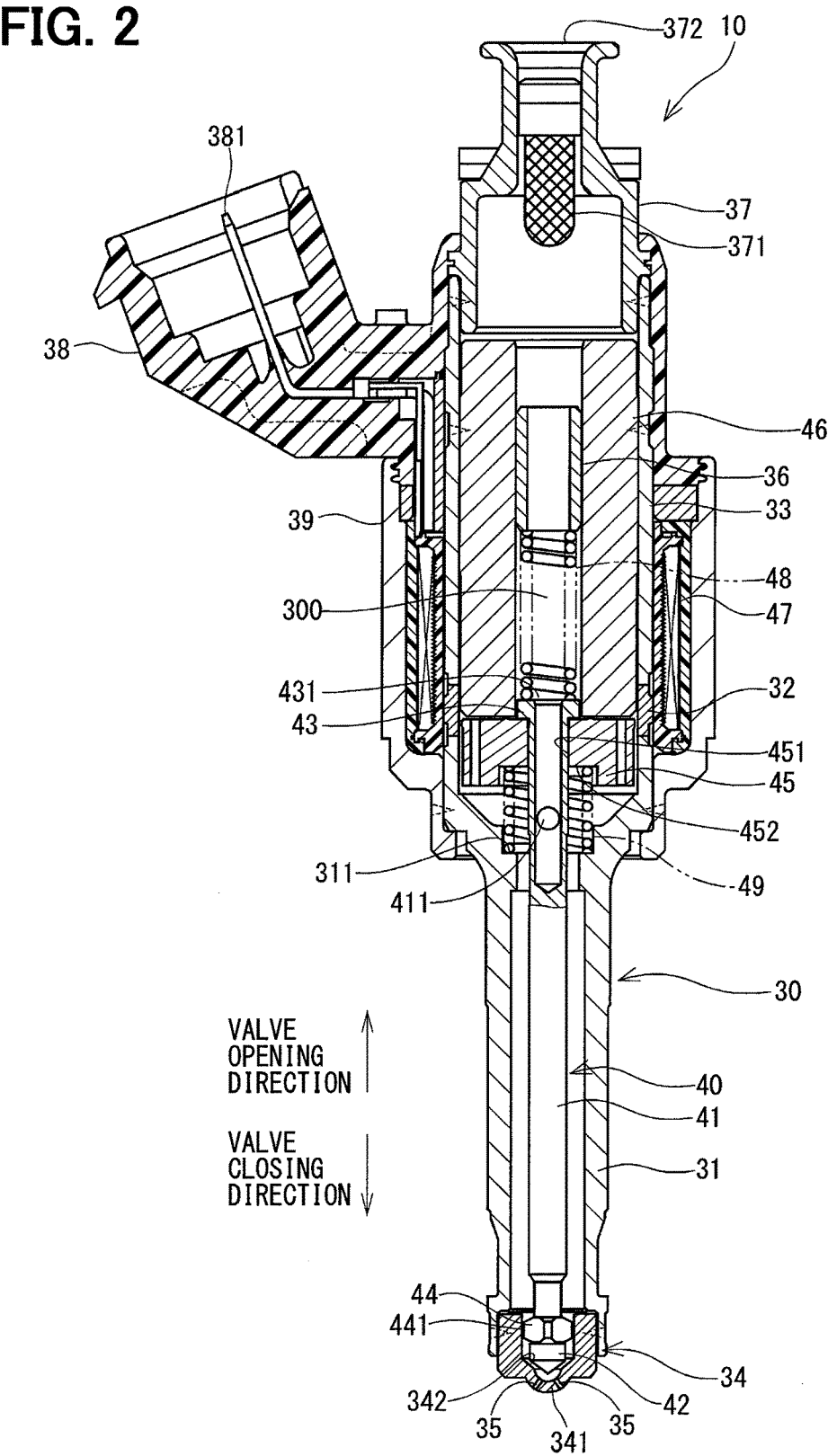
FIG. 2 is a cross-sectional view of the fuel injection valve to be controlled by the fuel injection valve control device according to the first embodiment of the present disclosure.

Next, a configuration of the fuel injection valve 10 will be described with reference to FIG. 2. The fuel injection valve 10 includes a housing 30, a needle 40, a movable core 45, a fixed core 46, a coil 47, springs 48, 49, and so on. FIG. 2 illustrates a valve opening direction that is a direction along which the needle 40 is separated from a valve seat 342 and a valve closing direction along which the needle 40 abuts against the valve seat 342.

The housing 30 includes a first cylinder member 31, a second cylinder member 32, a third cylinder member 33, and an injection nozzle 34. Each of the first cylinder member 31, the second cylinder member 32, and the third cylinder member 33 is a substantially cylindrical member. The first cylinder member 31, the second cylinder member 32, and the third cylinder member 33 are disposed coaxially in the stated order, and joined to each other.

The injection nozzle 34 is disposed on an end portion of the first cylinder member 31 opposite to the second cylinder member 32 and welded to the first cylinder member 31. The injection nozzle 34 is a bottomed cylindrical member. A bottom portion 341 of the injection nozzle 34 includes multiple injection holes 35 that communicate between an internal and an external of the housing 30. An inner wall of the bottom portion 341 is formed with the annular valve seat 342.

The needle 40 is housed to be reciprocatable in the housing 30. The needle 40 includes a shaft portion 41, a seal portion 42, a flange portion 43, and so on.

The shaft portion 41 is a cylindrical rod-shaped portion. A sliding contact portion 44 is disposed between the shaft portion 41 and the seal portion 42. The sliding contact portion 44 is a substantially cylindrical portion, and a part of an outer wall 441 is chamfered. A non-chamfered portion of the outer wall 441 in the sliding contact portion 44 is slidable on an inner wall of the injection nozzle 34. With the above configuration, the injection nozzle 34 guides a reciprocating movement of a tip of the needle 40 on the valve seat 342 side. The shaft portion 41 has a hole 411 that connects an inside and an outside of an end portion of the shaft portion 41 on the fixed core 46 side.

The seal portion 42 is disposed on an end portion of the shaft portion 41 on the valve seat 342 side to be abuttable against the valve seat 342. The needle 40 opens and closes the injection holes 35 when the seal portion 42 is separated from the valve seat 342 or abutted against the valve seat 342, and allows or blocks a communication between an inside and an outside of the housing 30.

The flange portion 43 is disposed on a radially outer side of an end portion of the shaft portion 41 opposite to the seal portion 42. An end face of the flange portion 43 on the valve seat 342 side is abuttable against the movable core 45.

The needle 40 reciprocates inside of the housing 30 while the sliding contact portion 44 is supported by the injection nozzle 34 and the shaft portion 41 is supported by the second cylinder member 32 through the movable core 45.

The movable core 45 is a substantially cylindrical member disposed on a radially outer side of the shaft portion 41. The movable core 45 is magnetically stabilized. The movable core 45 has a through hole 451 substantially in the center of the movable core 45. The shaft portion 41 of the needle 40 is inserted into the through hole 451.

The fixed core 46 is a substantially cylindrical member disposed on a side of the movable core 45 opposite to the valve seat 342. The fixed core 46 is magnetically stabilized. The fixed core 46 is welded to the third cylinder member 33 of the housing 30 and fixed to an inside of the housing 30.

The coil 47 is a substantially cylindrical member and disposed to surround mainly radially outer sides of the second cylinder member 32 and the third cylinder member 33. When a current is supplied to the coil 47 from the valve control portion 251, the coil 47 develops a magnetic field. When a magnetic field is developed around the coil 47, a magnetic circuit is formed by the fixed core 46, the movable core 45, the first cylinder member 31, and the third cylinder member 33. With the above configuration, a magnetic attraction force is generated between the fixed core 46 and the movable core 45, and the movable core 45 is attracted to the fixed core 46. In this situation, the needle 40 that abuts against a surface of the movable core 45 opposite to the valve seat 342 side travels to the fixed core 46 side, that is, in the valve opening direction together with the movable core 45. The movable core 45, the fixed core 46, and the coil 47 correspond to a "drive portion".

The spring 48 is disposed such that one end of the spring 48 abuts against a spring abutment surface 431 of the flange portion 43. The other end of the spring 48 abuts against one end of an adjusting pipe 36 that is press-fitted into an inside of the fixed core 46. The spring 48 has a force extending in an axial direction. With the above configuration, the spring 48 urges the needle 40 in a direction of the valve seat 342, that is, in the valve closing direction together with the movable core 45.

One end of the spring 49 abuts against a step surface 452 of the movable core 45. The other end of the spring 49 abuts against an annular step surface 311 provided in the first cylinder member 31. The spring 49 has a force extending in the axial direction. With the above configuration, the spring 49 urges the movable core 45 in a direction opposite to the valve seat 342, that is, in the valve opening direction together with the needle 40.

In the present embodiment, an urging force of the spring 48 is set to be larger than an urging force of the spring 49. With the above configuration, in a state where no current flows into the coil 47, the seal portion 42 of the needle 40 abuts against the valve seat 342, that is, is in the valve closing state.

A substantially cylindrical fuel introduction pipe 37 is fitted into and welded to an end portion of the third cylinder member 33 opposite to the second cylinder member 32. A filter 371 is disposed inside of the fuel introduction pipe 37. The filter 371 collects a foreign matter contained in the fuel flowing from an introduction port 372 of the fuel introduction pipe 37.

Radially outer sides of the fuel introduction pipe 37 and the third cylinder member 33 are molded with resin. A molded portion is equipped with a connector 38. A terminal 381 for supplying an electric power to the coil 47 is insert-molded into the connector 38. In addition, a cylindrical holder 39 is disposed on a radially outer side of the coil 47 so as to cover the coil 47.

The fuel flowing from the introduction port 372 of the fuel introduction pipe 37 flows in a radially inner side of the fixed core 46, an inside of the adjusting pipe 36, the inside of the flange portion 43 and the shaft portion 41 of the needle 40, the hole 411, and a gap between the first cylinder member 31 and the shaft portion 41 of the needle 40, and is guided into the inside of the injection nozzle 34. In other words, a portion extending from the introduction port 372 of the fuel introduction pipe 37 to the gap between the first cylinder member 31 and the shaft portion 41 of the needle 40 serves as a fuel passage 300 for introducing the fuel into the injection nozzle 34.

Figure 3:
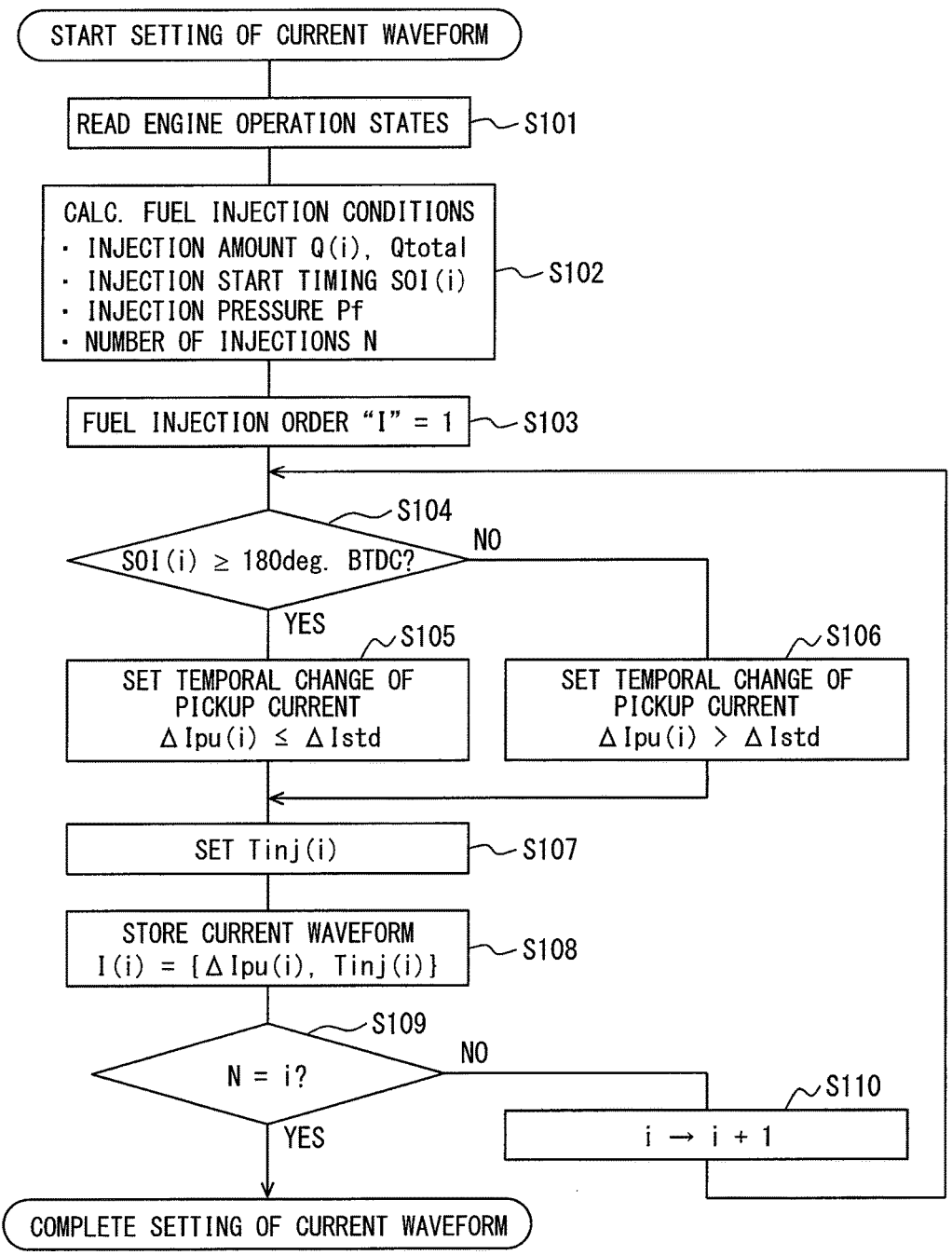
FIG. 3 is a flowchart of a fuel injection control in the fuel injection valve control device according to the first embodiment of the present disclosure.
Figure 4:
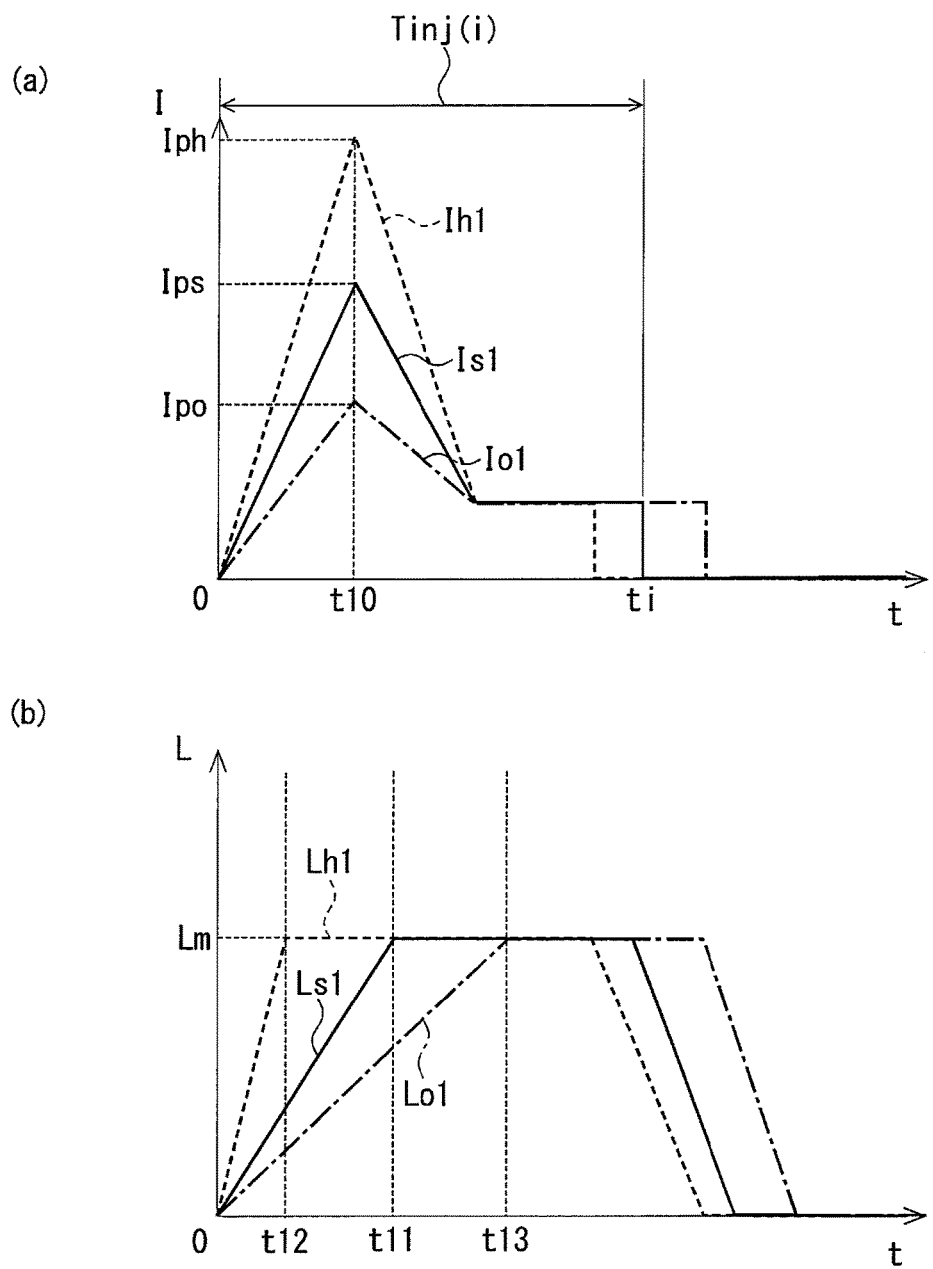
FIG. 4 is a characteristic diagram illustrating a temporal change in a current to be supplied to a drive portion of the fuel injection valve and a lift amount of a needle according to the first embodiment of the present disclosure.

Next, a control method of the fuel injection valve 10 by the fuel injection valve control device 1 will be described with reference to FIG. 3. FIG. 3 illustrates a flowchart of a method of setting a current waveform of a current to be supplied to the fuel injection valve 10. In the fuel injection valve control device 1, a current waveform for controlling a drive of the fuel injection valve 10 is set along a flowchart illustrated in FIG. 3 for each combustion cycle of an intake stroke, a compression stroke, an expansion stroke, and an exhaust stroke in the engine 11.

In S101, the operation states of the engine 11 are read. The operation-condition calculation portion 241 reads operation states of the engine 11 on the basis of the electric signals output by the intake air pressure sensor 21, the crank angle sensor 22, and the injection pressure sensor 23. Meanwhile, in the first embodiment, the pressure of the gas flowing in the intake air passage 120, the rotation angle of the crankshaft 116, and the pressure of the fuel in the fuel delivery pipe 17 are read as "the operation states of the internal combustion engine". However, numerical values for reading the operation states of the engine 11 are not limited to this example.

Next, in S102, the fuel injection conditions of the fuel injection valve 10 are calculated. The operation-condition calculation portion 241 calculates the fuel injection conditions of the fuel injection valve 10 in one combustion cycle on the basis of the operation states of the engine 11 which is read in S101. In the first embodiment, a fuel injection amount Qtotal, an injection start timing SOI(i) of the fuel, a fuel injection pressure Pf, and the number of injections N in the one combustion cycle are calculated. In addition, when the number of injections N in the one combustion cycle is two or more, the operation-condition calculation portion 241 calculates a fuel injection amount Q(i) in each fuel injection. In this example, for example, in this description, the number of injections N is set as two, but the number of fuel injections in one combustion cycle is not limited to this example. The calculated fuel injection conditions are stored in the ROM, the RAM, or the like once.

Next, in S103 to S110, the fuel-injection setting portion 242 sets a current waveform to be supplied to the coil 47 of the fuel injection valve 10 on the basis of the fuel injection conditions calculated in S102.

In S103 subsequent to S102, the fuel-injection setting portion 242 confirms that a current waveform to be set now is a current waveform of a first fuel injection in one combustion cycle.

Next, in S104, the fuel-injection setting portion 242 determines whether an injection start timing SOI(1) of the first fuel injection calculated in S102 is equal to or more than 180 degrees BTDC corresponding to a bottom dead center between the intake stroke and the compression stroke of the engine 11, or not. If the injection start timing SOI(1) of the first fuel injection calculated in S102 is equal to or more than the 180 degrees BTDC, in other words, if the engine 11 is in the intake stroke, or the piston 113 is located at a position of the bottom dead center between the intake stroke and the compression stroke of the engine 11, the flow proceeds to S105. If the injection start timing SOI(1) of the first fuel injection calculated in S102 is less than 180 degrees BTDC, in other words, if the engine 11 is in the compression stroke, the flow proceeds to S106. The 180 degrees BTDC corresponds to a "predetermined crank angle".

Next, in S105, the fuel-injection setting portion 242 sets the current waveform so that a temporal change ΔIpu(1) of a pickup current in the needle 40 in the first fuel injection becomes equal to or less than a predetermined reference value ΔIstd. In addition, in S106, the fuel-injection setting portion 242 sets the current waveform so that the temporal change of the pickup current in the needle 40 to be supplied to the fuel injection valve 10 becomes more than the predetermined reference value ΔIstd.

Now, the pickup current of the needle 40 in the first embodiment will be described with reference to FIGS. 4(a) and 4(b). FIG. 4(a) illustrates a temporal change of a current I to be supplied to the coil 47 by the fuel injection control portion 25. In addition, FIG. 4(b) illustrates a temporal change of the lift amount L of the needle 40 that moves in the valve opening direction by the supply of the current.

In the fuel injection valve control device 1 according to the first embodiment, as illustrated in FIG. 4(a), the fuel injection control portion 25 is disposed so that a maximum value of the pickup current in the needle 40 is changeable. In this example, the "pickup current" of the needle 40 is a current to be supplied to the coil 47 for allowing the needle 40 to travel in the valve opening direction from a state in which the fuel injection valve 10 is opened. In FIG. 4(a), the pickup current of the needle 40 represents a current flowing since a time 0 until a time t10 at which the current becomes maximal.

In the first embodiment, a solid line Is1 illustrated in FIG. 4(a) represents, for example, the temporal change of the current when the injection start timing SOI(i) is 180 degrees BTDC. In the solid line Is1, the current waveform is set so that the current at the time t10 becomes a maximum peak current Ips. In this situation, a temporal change ΔIpu(i) of the pickup current, that is, an increase/decrease amount of the current per unit time is set as a predetermined reference value ΔIstd. In the first embodiment, when the temporal change ΔIpu(i) of the pickup current is the predetermined reference value ΔIstd, the temporal change of the lift amount L of the needle 40 in the fuel injection valve 10 is indicated by a solid line Ls1 illustrated in FIG. 4(b). When the temporal change ΔIpu(i) of the pickup current is the predetermined reference value ΔIstd, the travel speed of the needle 40 since the time 0 until a time t11 at which the lift amount becomes a lift amount Lm that is a maximum lift amount corresponds to a "reference travel speed".

On the other hand, when the current waveform is set so that the peak current at the time t10 becomes a peak current Ipo less than the peak current Ips (dash-dot line Io1 in FIG. 4(a)), the temporal change ΔIpu(i) of the pickup current in the needle 40 is reduced more than the predetermined reference value ΔIstd as illustrated in FIG. 4(a). In this situation, as indicated by a dotted line Lo1 in FIG. 4(b), a time until the needle 40 becomes the lift amount Lm becomes a time t13 which is longer than the time t11 of the solid line Is1. In other words, when the current waveform is set so that the peak current at the time t10 becomes the peak current Ipo less than the peak current Ips, the travel speed of the needle 40 is decreased more than the reference travel speed.

In addition, when the current waveform is set so that the peak current at the time t10 becomes a peak current Iph more than the peak current Ips (dotted line Ih1 in FIG. 4(a)), the temporal change ΔIpu(i) of the pickup current in the needle 40 becomes more than the predetermined reference value ΔIstd as illustrated in FIG. 4(a). In this situation, as indicated by a dotted line Lh1 of FIG. 4(b), a time until the needle 40 becomes the lift amount Lm becomes a time t12 that is shorter than the time t11 of the solid line Ls1. In other words, when the current waveform is set such that the peak current at the time t10 becomes the peak current Iph more than the peak current Ips, the travel speed of the needle 40 is increased as compared with the reference travel speed.

As described above, in S105 and S106, the current waveform is set such that a magnitude of the peak current in the pickup current of the needle 40 is changed on the basis of the determination result in S104, and the temporal change of the pickup current in the needle 40 is changed.

Next, in S107, a time during which the current is supplied according to the fuel injection amount of the first fuel injection, that is, an injection command width Tinj(1) of the first fuel injection is set. More specifically, as illustrated in FIG. 4(a), a time during which the current I increases from "0" and then returns to "0", for example, in the solid line Is1 of FIG. 4(a), a time "ti" is set as an injection command width Tinj(i).

Then, in S108, information on the current waveform set in S105 to S107 is stored in the ROM, the RAM, or the like as information I(1) of the first fuel injection.

Then, in S109, it is determined whether current waveform set this time is a current waveform of an n-th fuel injection in the one combustion cycle, or not. For example, when the number of injections N set in S102 is two, and the setting of the current waveform at this time is the setting of the current waveform in the first fuel injection, the flow proceeds to S110.

Next, in S110, "1" is added to the order of the fuel injection where a previous current waveform has been set, the order of the fuel injections is set as "2", and the flow proceeds to S104.

Next, in S104 to S108, the current waveform in a second fuel injection in the one combustion cycle is set in the same manner as that of the first fuel injection.

Then, in S109, it is determined whether current waveform set this time is a current waveform of an n-th fuel injection in the one combustion cycle, or not. When the number of injections N set in S102 is "2", and the setting of the current waveform at this time is the setting of the current waveform in the second fuel injection, the setting of the current waveform of the fuel injection in the one combustion cycle is completed.

In the fuel injection valve control device 1 according to the first embodiment, the temporal change ΔIpu(i) of the pickup current of the needle 40 is changed, and the travel speed of the needle 40 is changed according to whether the injection start timing SOI(i) is larger than the 180 degrees BTDC, or not. Advantages of changing the travel speed of the needle 40 will be described with reference to FIGS. 5 to 7.

Figure 5:
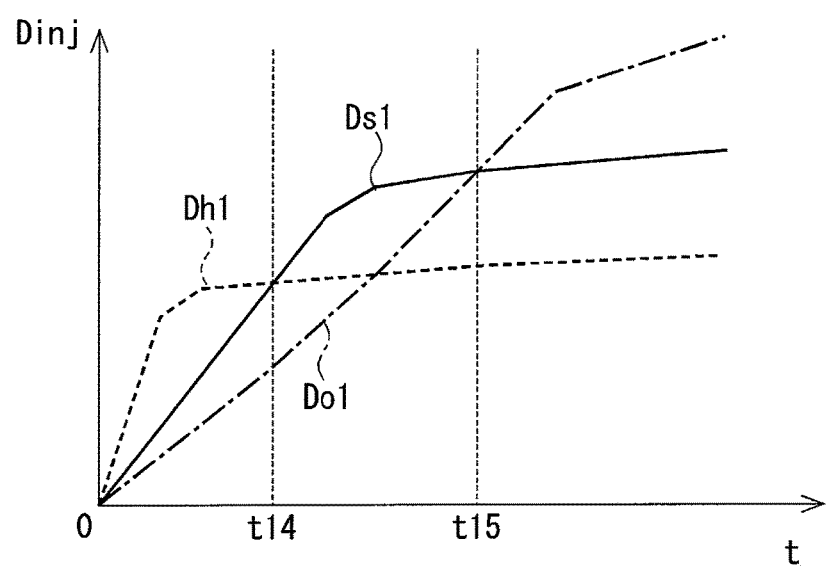
FIG. 5 is a characteristic diagram illustrating a relationship between an elapsed time and a spray arrival distance after fuel injection in the fuel injection valve control device according to the first embodiment of the present disclosure.

First, a relationship between the travel speed of the needle 40 and a spray arrival distance Dinj of the fuel will be described with reference to FIG. 5. In this example, the "spray arrival distance" represents a distance by which the fuel that has been injected from the fuel injection valve into an atomized state is reachable. In FIG. 5, a relationship between the spray arrival distance Dinj and a time "t" when the travel speed of the needle 40 is a reference travel speed is indicated by a sold line Ds1.

In the fuel injection valve 10, when the travel speed of the needle 40 is changed, the spray arrival distance Dinj of the fuel injected into the combustion chamber 110 is changed. More specifically, when the travel speed of the needle 40 becomes lower than the reference travel speed, as indicated by a dotted line Do1 in FIG. 5, immediately after the injection starts, the spray arrival distance Dinj is shorter than the sold line Ds1 (from a time "0" to a time t15 in FIG. 5). However, because the fuel is injected for a relatively long time, the spray arrival distance Dinj becomes longer than the sold line Ds1 after the time t15.

On the other hand, when the travel speed of the needle 40 becomes higher than the reference travel speed, the spray arrival distance Dinj becomes longer than the sold line Ds1 immediately after the injection starts as indicated by a dotted line Dh1 in FIG. 5 (from the time "0" to a time t14 in FIG. 5). However, because the fuel is injected only for a relatively short time, the spray arrival distance Dinj becomes shorter than the sold line Ds1 after the time t14.

In the fuel injection valve control device 1 according to the first embodiment, the fuel can be injected such that the injected fuel does not collide with an inner wall of the cylinder 111 and a piston surface 119 of the piston 113 which form the combustion chamber 110 with the use of a change in the spray arrival distance Dinj of the fuel caused by a change in the travel speed of the needle 40.

FIGS. 6(a) and 6(b) illustrate a relationship between the spray arrival distance Dinj of the fuel and the time "t". In FIGS. 6(a) and 6(b), a temporal change of a distance from the injection holes 35 of the fuel injection valve 10 to the inner wall of the engine 11 forming the combustion chamber 110, for example, the piston surface 119 of the piston 113 is indicated by a two-dot chain line Ep1. In FIGS. 6(a) and 6(b), a relationship between the spray arrival distance Dinj in the fuel injection valve in which the travel speed of the needle in the valve opening direction is not controlled and the time "t" is indicated by a solid line Es1. Hereinafter, the fuel injection valve in which the travel speed of the needle in the valve opening direction is not controlled is called a fuel injection valve in a comparative example.

FIG. 6(a) illustrates a relationship between the spray arrival distance Dinj and the time "t" when the crank angle is more than the 180 degrees BTDC. In the fuel injection valve of the comparative example, as indicated by the solid line Es1 illustrated in FIG. 6(a), because there is a time (a time from a time t16 to a time t17 in FIG. 6(a)) during which the spray arrival distance Dinj is longer than the distance from the injection holes of the fuel injection valve to the piston surface, there is a risk that the fuel may collide with the piston surface of the piston that travels from the top dead center to the bottom dead center between the time t16 and the time t17. However, in the fuel injection valve 10 in which the fuel injection is controlled by the fuel injection valve control device 1, as indicated by a dotted line Eh1 in FIG. 6(a), because the travel speed of the needle 40 in the valve opening direction is decreased, the spray arrival distance Dinj is not longer than the distance between the injection holes of the fuel injection valve and the piston surface. With the above configuration, the fuel injected by the fuel injection valve 10 does not collide with the piston surface 119.

FIG. 6(b) illustrates a relationship between the spray arrival distance Dinj and the time "t" when the crank angle is less than the 180 degrees BTDC. In the fuel injection valve of the comparative example, as indicated by the solid line Es1 illustrated in FIG. 6(b), because a time during which the spray arrival distance Dinj is longer than the distance from the injection holes of the fuel injection valve to the piston surface is relatively early (a time t181 in FIG. 6(b)), there is a risk that the fuel may collide with the piston surface of the piston that travels from the bottom dead center to the top dead center between the time t181 and a time t19. However, in the fuel injection valve 10 in which the fuel injection is controlled by the fuel injection valve control device 1, as indicated by a dotted line Eo1 in FIG. 6(b), the travel speed of the needle 40 in the valve opening direction is higher than that of the fuel injection valve of the comparative example immediately after the injection starts. However, in this situation, the piston 113 is located relatively away from the fuel injection valve 10, and the fuel is unlikely to collide with the piston surface 119 of the piston 113. In addition, when the travel speed of the needle 40 in the valve opening direction is increased, because the fuel injection is completed in a relative short time, the spray arrival distance Dinj is shortened. As a result, because a time when the fuel may collide with the piston surface 119 of the piston 113 is later than that of the fuel injection valve in the comparative example (a time t182 in FIG. 6(b)), the amount of fuel that collides with the piston surface 119 of the piston 113 is smaller than that of the fuel injection valve in the comparative example.

Figure 7:
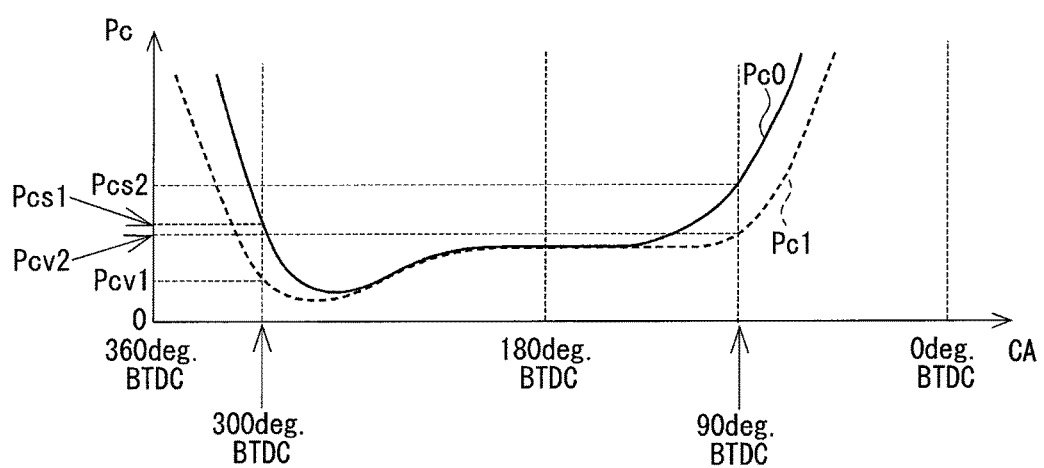
FIG. 7 is a characteristic diagram illustrating a relationship between a crank angle of an engine and the amount of particulate matter generated according to the first embodiment of the present disclosure.

FIG. 7 illustrates a relationship between the number of discharged particles Pc of the particulate matter in the engine 11 and a crank angle CA of the engine 11. In FIG. 7, a relationship between the number of discharged particles Pc of the particulate matter from the fuel injection valve 10 and the crank angle CA is indicated by a dotted line Pc1, and a relationship between the number of discharged particles Pc of the particulate matter from the fuel injection valve and the crank angle CA in the comparative example is indicated by a solid line Ps0.

Figure 6:
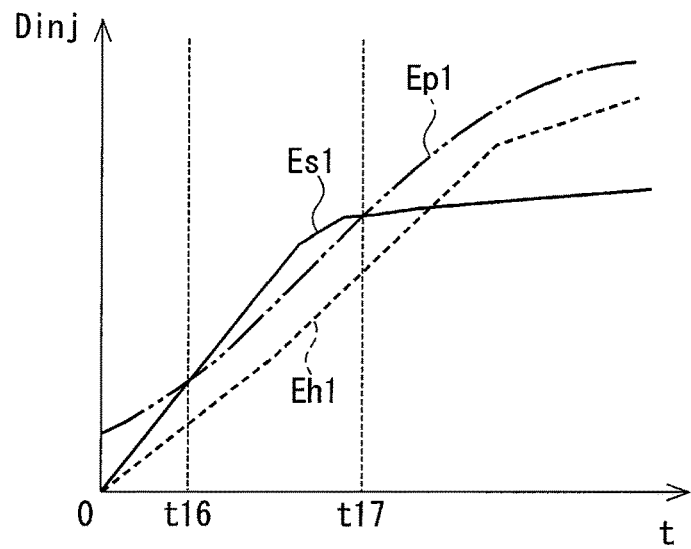
FIG. 6 is a characteristic diagram illustrating a relationship between the elapsed time and the spray arrival distance after the fuel injection in the fuel injection valve control device according to the first embodiment of the present disclosure.
Figure 6:
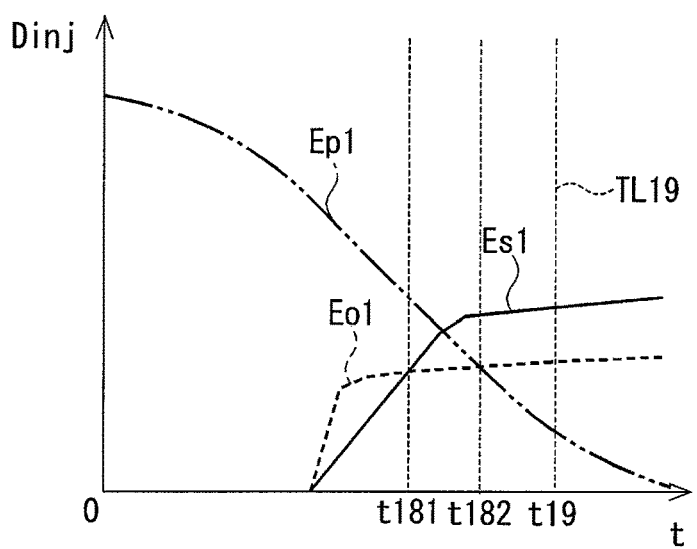

As described with reference to FIGS. 5 and 6, in the fuel injection valve control device 1 according to the first embodiment, when the injection start timing SOI(i) of the fuel is more than 180 degrees BTDC, the travel speed of the needle 40 in the valve opening direction is decreased, and the fuel injections are controlled such that the fuel injected into the piston 113 moved away from the fuel injection valve 10 toward the bottom dead center does not collide with the inner wall of the engine 11 forming the combustion chamber 110. With the above configuration, for example, in 300 degrees BTDC more than the 180 degree BTDC in the crank angle of the engine 11 represented by the axis of abscissa in FIG. 7, as compared with the number of discharged particles Pcs1 of the particulate matter in the fuel injection valve of the comparative example, the number of discharged particles Pcv1 of the particulate matter in the fuel injection valve 10 is reduced.

In addition, when the injection start timing SOI(i) of the fuel is equal to or less than the 180 degrees BTDC, the travel speed of the needle 40 in the valve opening direction is set to be equal to or higher than the reference travel speed, the fuel injection is completed before the piston 113 that travels toward the top dead center comes closer to the fuel injection valve 10, and the fuel injections is controlled such that the injected fuel does not collide with the inner wall of the engine 11 forming the combustion chamber 110. With the above configuration, in 90 degrees BTDC less than the 180 degrees BTDC in the crank angle represented by the axis of abscissa in FIG. 7, as compared with the number of discharged particles Pcs2 of the particulate matter in the fuel injection valve of the comparative example, the number of discharged particles Pcv2 of the particulate matter in the fuel injection valve 10 is reduced.

As described above, in the fuel injection valve control device 1 according to the first embodiment, the valve opening speed of the needle 40 is changed according to the crank angle, and the injected fuel is unlikely to collide with the inner wall of the engine 11 forming the combustion chamber 110. With the above configuration, a timing when the fuel injections can be performed can be increased while the amount of produced particulate matter is reduced. Therefore, the fuel injection valve control device 1 can improve the combustion efficiency of the fuel in the combustion chamber 110 and improve the fuel efficiency of the engine 11.

Second Embodiment

Figure 8:
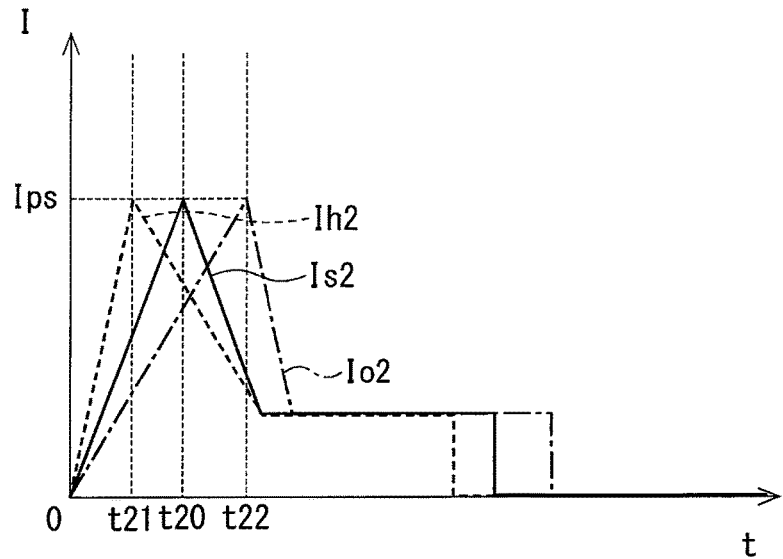
FIG. 8 is a characteristic diagram illustrating a temporal change in a current to be supplied to a drive portion of a fuel injection valve and a lift amount of a needle according to a second embodiment of the present disclosure.
Figure 8:
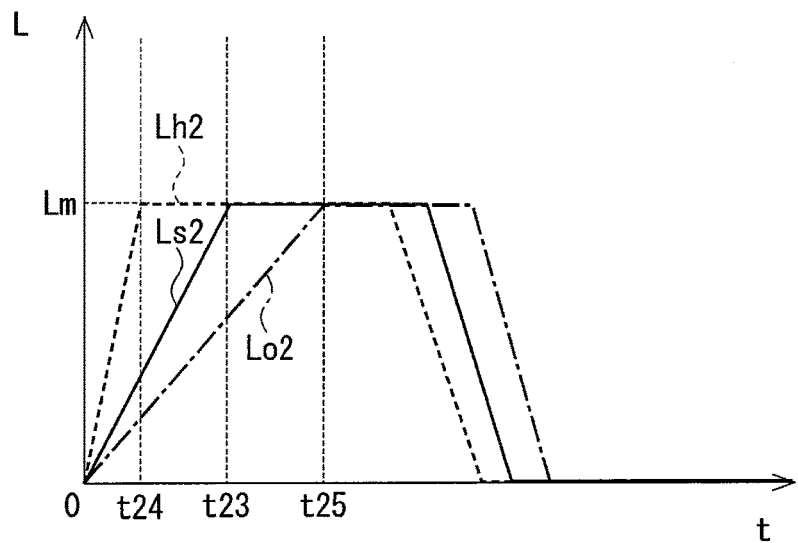

Subsequently, a fuel injection valve control device according to a second embodiment of the present disclosure will be described with reference to FIG. 8. The second embodiment is different from the first embodiment in a method of changing the travel speed of the needle in the valve opening direction. The substantially same parts as those in the first embodiment are denoted by identical reference numerals or symbols, and their description will be omitted.

In the fuel injection valve control device according to the second embodiment, the current waveform is set for each fuel injection along the flowchart of the method for setting the current waveform in the first embodiment (refer to FIG. 3). In this situation, in the fuel injection valve control device according to the second embodiment, when a temporal change $\Delta Ipu(i)$ in a pickup current of a needle 40 is changed in S105 and S106, a time until the pickup current of the needle 40 reaches a peak current Ips is changed. Hereinafter, the control contents will be described with reference to FIGS. 8(a) and 8(b).

FIG. 8(a) illustrates a temporal change of a current I to be supplied to the coil 47 by the fuel injection control portion 25. In FIG. 8(a), a temporal change of the current when an injection start timing SDI is 180 degrees BTDC is denoted by a solid line Is2. In addition, FIG. 8(b) illustrates a temporal change in a lift amount L of the needle 40 in a valve opening direction by the supply of the current. In FIG. 8(b), a temporal change of the lift amount of the needle 40 when the injection start timing SDI is 180 degrees BTDC is denoted by a solid line Ls2.

In S105, as indicated by a dotted line 102 in FIG. 8(a), when the fuel-injection setting portion 242 sets a current waveform such that a time until reaching the peak current Ips is set as a time t22 longer than a time t20, a temporal change $\Delta Ipu(i)$ of the pickup current in the needle 40 becomes less than a predetermined reference value $\Delta Istd$. In this situation, as indicated by a dotted line Lot in FIG. 8(b), a time until the needle 40 becomes the lift amount Lm becomes a time t25 which is longer than the time t23 of the solid line Ls2.

In S106, as indicated by a dotted line Ih2 in FIG. 8(a), when the fuel-injection setting portion 242 sets a current waveform such that a time until reaching the peak current Ips is set as a time t21 shorter than the time t20 required until reaching the peak current Ips by a solid line Is, a temporal change $\Delta Ipu(i)$ of the pickup current in the needle 40 becomes more than the predetermined reference value $\Delta Istd$. In this situation, as indicated by a dotted line Lh2 of FIG. 8(b), a time until the needle 40 becomes the lift amount Lm becomes a time t24 that is shorter than the time t23 of the solid line Ls2.

In the fuel injection valve control device according to the second embodiment, when the injection start timing SOI(i) is equal to or more than the 180 degrees BTDC, as indicated by the dotted line 102 in FIG. 8(a), a time until reaching the peak current Ips is set to be equal to or shorter than the time in the case of the 180 degrees BTDC, the travel speed of the needle 40 in the valve opening direction is set to be equal to or lower than the reference travel speed. When the injection start timing SOI(i) is less than the 180 degrees BTDC, as indicated by the dotted line Ih2 in FIG. 8(a), a time until reaching the peak current Ips is set to be shorter than the time in the case of the 180 degrees BTDC, the travel speed of the needle 40 in the valve opening direction is set to be equal to or higher than the reference travel speed. With the above configuration, the fuel injected by the fuel injection valve 10 is unlikely to collide with the inner wall of the engine 11 forming the combustion chamber 110. Therefore, the second embodiment obtains the same advantages as those in the first embodiment.

Third Embodiment

Subsequently, a fuel injection valve control device according to a third embodiment of the present disclosure will be described with reference to FIGS. 9 and 10. The third embodiment is different from the first embodiment in a method of changing the travel speed of the needle in the valve opening direction. The substantially same parts as those in the first embodiment are denoted by identical reference numerals or symbols, and their description will be omitted.

Figure 9:
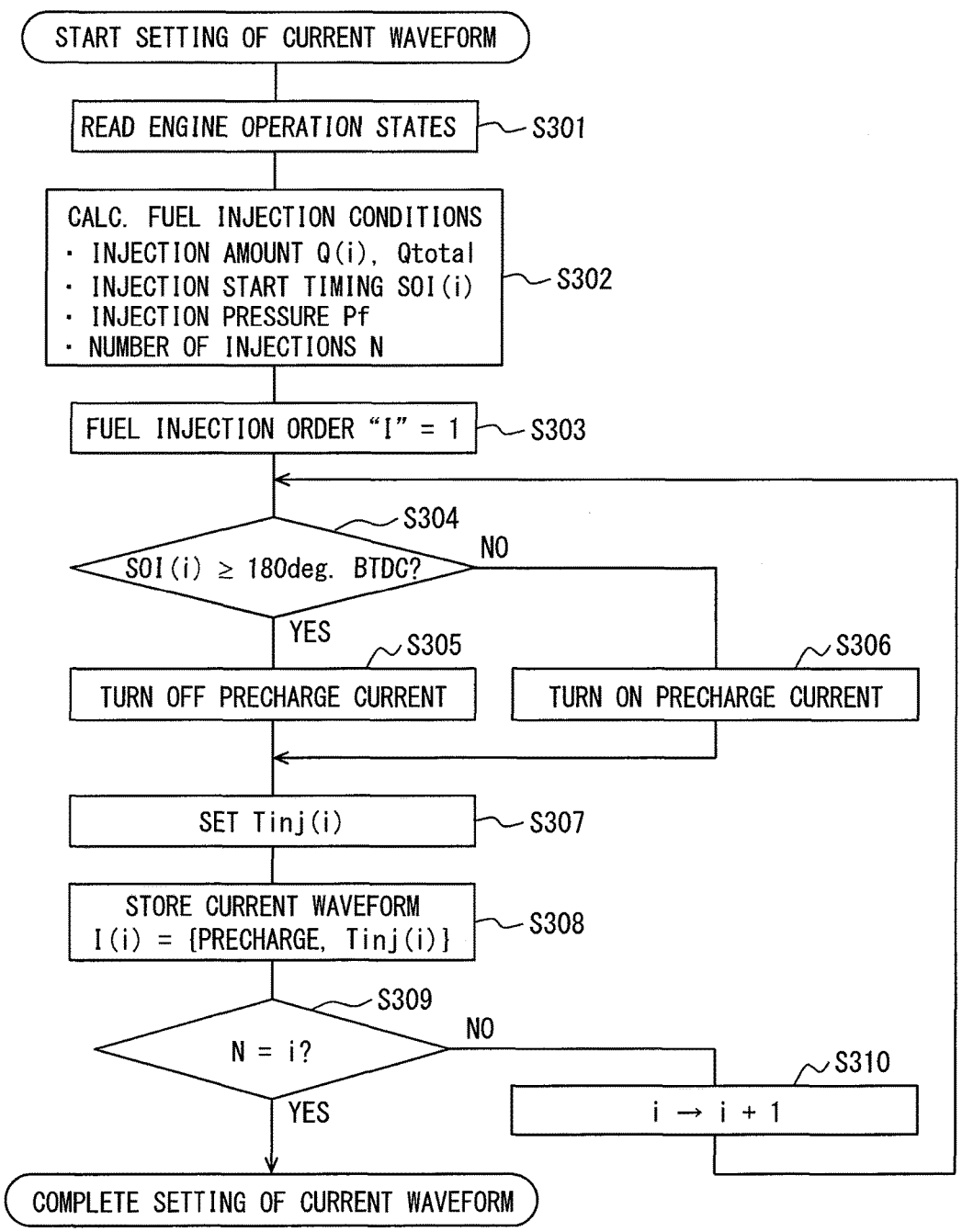
FIG. 9 is a flowchart of a fuel injection control in a fuel injection valve control device according to a third embodiment of the present disclosure.

In the fuel injection valve control device according to the third embodiment, a current waveform is set for each fuel injection along a flowchart illustrated in FIG. 9.

First, in S301, as in S101 of the first embodiment, an operation state of the engine 11 is read. Then, in S302, as in S102 of the first embodiment, fuel injection conditions of a fuel injection valve 10 are calculated. Then, in S303, as in S103 of the first embodiment, it is confirmed that a current waveform set now is a current waveform of a first fuel injection in one combustion cycle.

Then, in S304, as in S104 of the first embodiment, it is determined whether the injection start timing SOI(1) of the first fuel injection calculated in S302 is equal to or more than a crank angle 180 degrees BTDC, or not. If the injection start timing SOI(1) of the first fuel injection calculated in S302 is equal to or more than the 180 degrees BTDC, the process proceeds to S305. If the injection start timing SOI(1) of the first fuel injection calculated in S102 is less than the 180 degrees BTDC, the process proceeds to S306.

Then, in S305, the fuel-injection setting portion 242 sets the current waveform so as to turn OFF the precharge current. In S306, the fuel-injection setting portion 242 sets the current waveform so as to turn ON the precharge current.

Now, a change in the travel speed of the needle 40 in the valve opening direction due to the presence or absence of the precharge current will be described with reference to FIGS. 10(a) and 10(b). FIG. 10(a) illustrates a temporal change in a current I to be supplied to the coil 47 by the fuel injection control portion 25. FIG. 10(b) illustrates a temporal change in the lift amount L of the needle 40.

In the fuel injection valve control device 1 according to the third embodiment, as illustrated in FIG. 10(a), the fuel injection control portion 25 enables the precharge current as "pre-current" to flow before the pickup current of the needle 40 flows.

Figure 10:
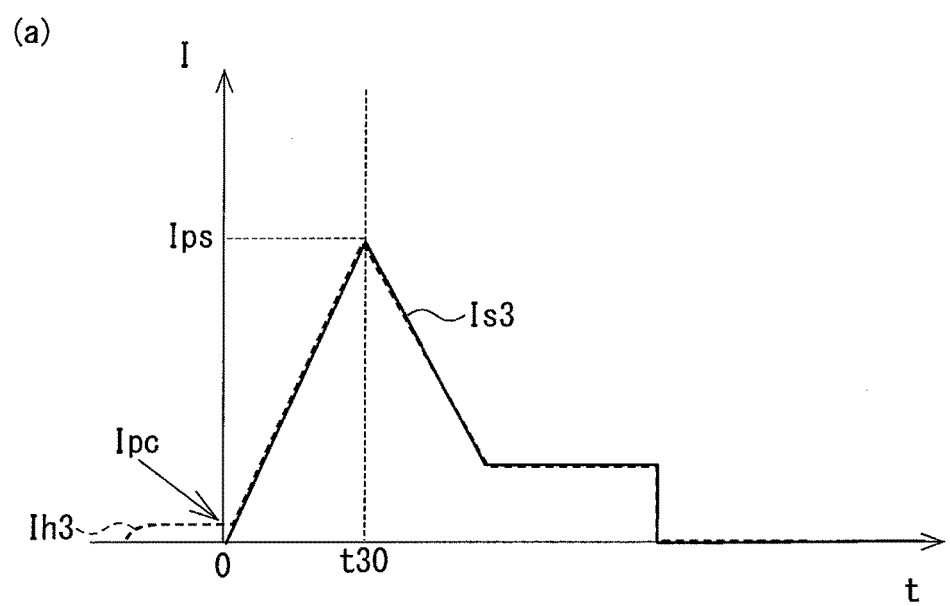
FIG. 10 is a characteristic diagram illustrating a temporal change in a current to be supplied to a drive portion of a fuel injection valve and a lift amount of a needle according to a third embodiment of the present disclosure.
Figure 10:
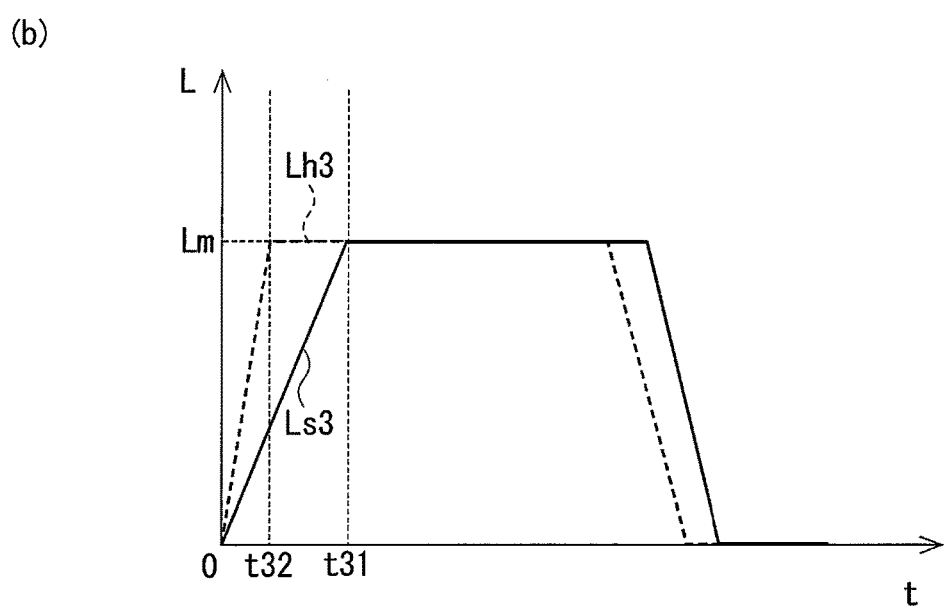

In S305, when the fuel injection control portion 25 sets a current waveform for turning OFF the precharge current, a current in which the current value becomes the peak current Ips at a time t30 as indicated by a solid line Is3 of FIG. 10(*a*) flows in the coil 47. With the above configuration, the lift amount L of the needle 40 is changed as indicated by a solid line Ls3 in FIG. 10(*b*), and the lift amount L is maximized at a time t31.

On the other hand, in S306, when the fuel injection control portion 25 sets a current waveform for turning ON the precharge current, a precharge current Ipc as large as the movable core 45 is not attracted to the fixed core 46 flows in the coil 47 before the time "0" as indicated by the dotted line Ih3 of FIG. 10(*a*). After the precharge current Ipc has flowed, when the current having the same current waveform as that of the solid line Ls3 flows in the coil 47, the lift amount L of the needle 40 is maximized at a time t32 shorter than the time t31 because the travel speed of the needle 40 becomes higher than that of the solid line Ls3 as indicated by a dotted line Lh3 in FIG. 10(*b*).

Subsequent to S305 and S306, in S307, the fuel injection control portion 25 sets the injection command width Tinj(1) of the first fuel injection as in S107 of the first embodiment. Then, in S308, as in S108 of the first embodiment, the fuel injection control portion 25 stores information on the current waveform set in S305, S306, and S307 as information I(1) of the first fuel injection in the ROM, the RAM, or the like. Next, in S309, as in S109 of the first embodiment, it is determined whether the current waveform set this time is a current waveform of an N-th fuel injection in the one combustion cycle, or not. When the setting of the current waveform at this time is smaller than the number of injections N in the one combustion cycle, the process proceeds to S310. In S310, as in S110 of the first embodiment, "1" is added to the order of the fuel injection in which the previous setting of the current waveform is performed, and the process proceeds to S304. When the setting of the current waveform at this time has the same number as the number of injections N in the one combustion cycle, the setting of the current waveform of the fuel injections in the one combustion cycle is completed.

In the fuel injection valve control device according to the third embodiment, when the injection start timing SOI(i) is less than the 180 degrees BTDC, the current waveform for turning ON the precharge current is set, and the travel speed of the needle 40 in the valve opening direction is increased more than the reference travel speed. As a result, when the injection start timing SOI(i) is less than the 180 degrees BTDC, the fuel injected by the fuel injection valve 10 is unlikely to collide with the inner wall of the engine 11 forming the combustion chamber 110. Therefore, the third embodiment has the same advantages as those in the first embodiment.

In addition, in the fuel injection valve control device according to the third embodiment, the travel speed of the needle 40 in the valve opening direction can be changed by only turning ON and OFF the precharge current. With the above configuration, the amount of produced particulate matter is reduced under a relatively easy control, and a timing when the fuel injections can be performed can be increased.

Fourth Embodiment

Hereinafter, a fuel injection valve control device according to a fourth embodiment of the present disclosure will be described with reference to FIG. 11. The fourth embodiment is different from the first embodiment in a temporal change in the travel speed of the needle in the valve opening direction. The substantially same parts as those in the first embodiment are denoted by identical reference numerals or symbols, and their description will be omitted.

In the fuel injection valve control device according to the fourth embodiment, the current waveform is set for each fuel injection along the flowchart of the method for setting the current waveform in the first embodiment (refer to FIG. 3). In this situation, in the fuel injection valve control device according to the fourth embodiment, in S105 and S106, a temporal change in a pickup current of the needle 40 is changed. Hereinafter, the control contents will be described with reference to FIGS. 11(*a*) and 11(*d*). FIG. 11(*a*) illustrates a temporal change in a current I to be supplied to the coil 47 by the fuel injection control portion 25. In FIG. 11(*a*), a temporal change in the current when an injection start timing SOI(i) is 180 degrees BTDC is indicated by a solid line Is4. FIG. 11(*b*) illustrates a temporal change in the lift amount L of the needle 40. In FIG. 11(*b*), a temporal change in the lift amount L of the needle 40 when the injection start timing SOI(i) is the 180 degrees BTDC is indicated by a solid line Ls4.

In S105, the fuel-injection setting portion 242 sets the current waveform so that a temporal change ΔIpu(i) of a pickup current in the needle 40 becomes equal to or less than a predetermined reference value ΔIstd.

Figure 11:
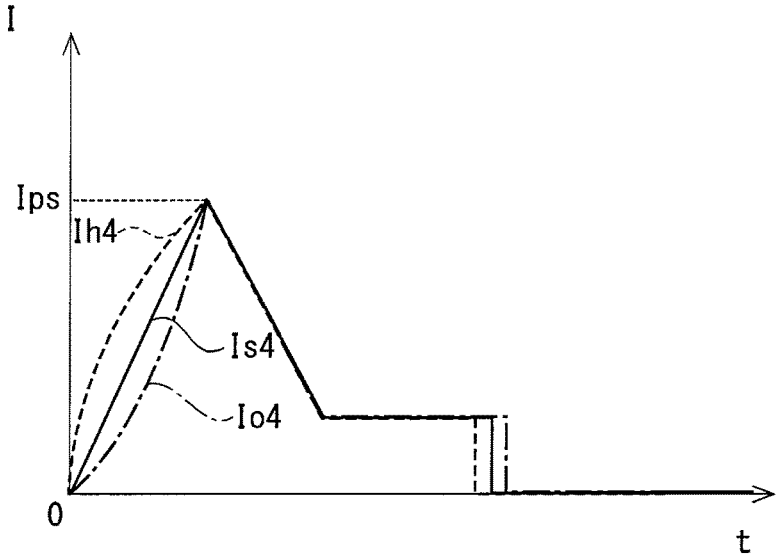
FIG. 11 is a characteristic diagram illustrating a temporal change in a current to be supplied to a drive portion of a fuel injection valve and a lift amount of a needle according to a fourth embodiment of the present disclosure.
Figure 11:
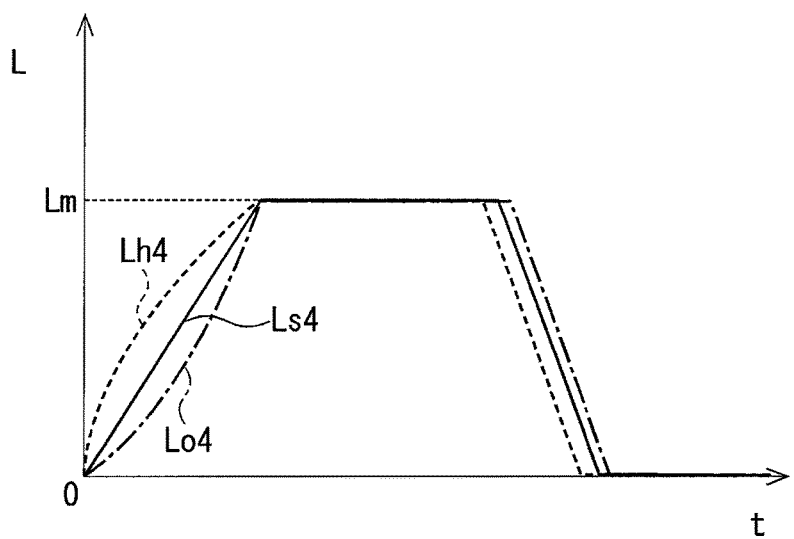

In this situation, in the fourth embodiment, a current waveform is set such that a temporal change ΔIpu(i) of the pickup current becomes less than a predetermined reference value ΔIstd immediately after the pickup current starts to flow as indicated by a dotted line 104 of FIG. 11(*a*). Further, the current waveform is set such that, when a current value of the pickup current comes closer to a peak current Ips, a temporal change ΔIpu(i) in the pickup current becomes more than that immediately after the pickup current starts to flow. With the above configuration, as indicated by a dotted line Lo4 in FIG. 11(*b*), the travel speed of the needle 40 in the valve opening direction is lower than the reference travel speed immediately after traveling, but becomes higher than the reference travel speed when the lift amount comes closer to the maximum lift amount Lm.

In S106, the fuel-injection setting portion 242 sets the current waveform so that the temporal change of the pickup current in the needle 40 becomes more than the predetermined reference value ΔIstd. In this situation, in the fourth embodiment, the current waveform is set such that the temporal change ΔIpu(i) of the pickup current becomes more than the predetermined reference value ΔIstd immediately after the pickup current starts to flow as indicated by a dotted line Ih4 of FIG. 11(*a*). Further, the current waveform is set such that, when the current value of the pickup current comes closer to the peak current Ips, the temporal change ΔIpu(i) in the pickup current becomes less than that immediately after the pickup current starts to flow. With the above configuration, as indicated by the dotted line Lo4 in FIG. 11(*b*), the travel speed of the needle 40 in the valve opening direction is relatively high immediately after traveling, but becomes relatively low when the lift amount comes closer to the maximum lift amount Lm.

In the fuel injection valve control device according to the fourth embodiment, a temporal change in a pickup current of the needle 40 is changed. With the above configuration, the travel speed of the needle 40 in the valve opening direction can be freely changed in one fuel injection. Therefore, the fourth embodiment can obtain the advantages of the first embodiment and adjust the spray arrival distance Dinj of the fuel according to the state of the engine 11.

Fifth Embodiment

Subsequently, a fuel injection valve control device according to a fifth embodiment of the present disclosure will be described with reference to FIGS. 12 and 13. The fifth embodiment is different from the first embodiment in that a travel speed of a needle in a valve opening direction is different for each fuel injection. The substantially same parts as those in the first embodiment are denoted by identical reference numerals or symbols, and their description will be omitted.

Figure 12:
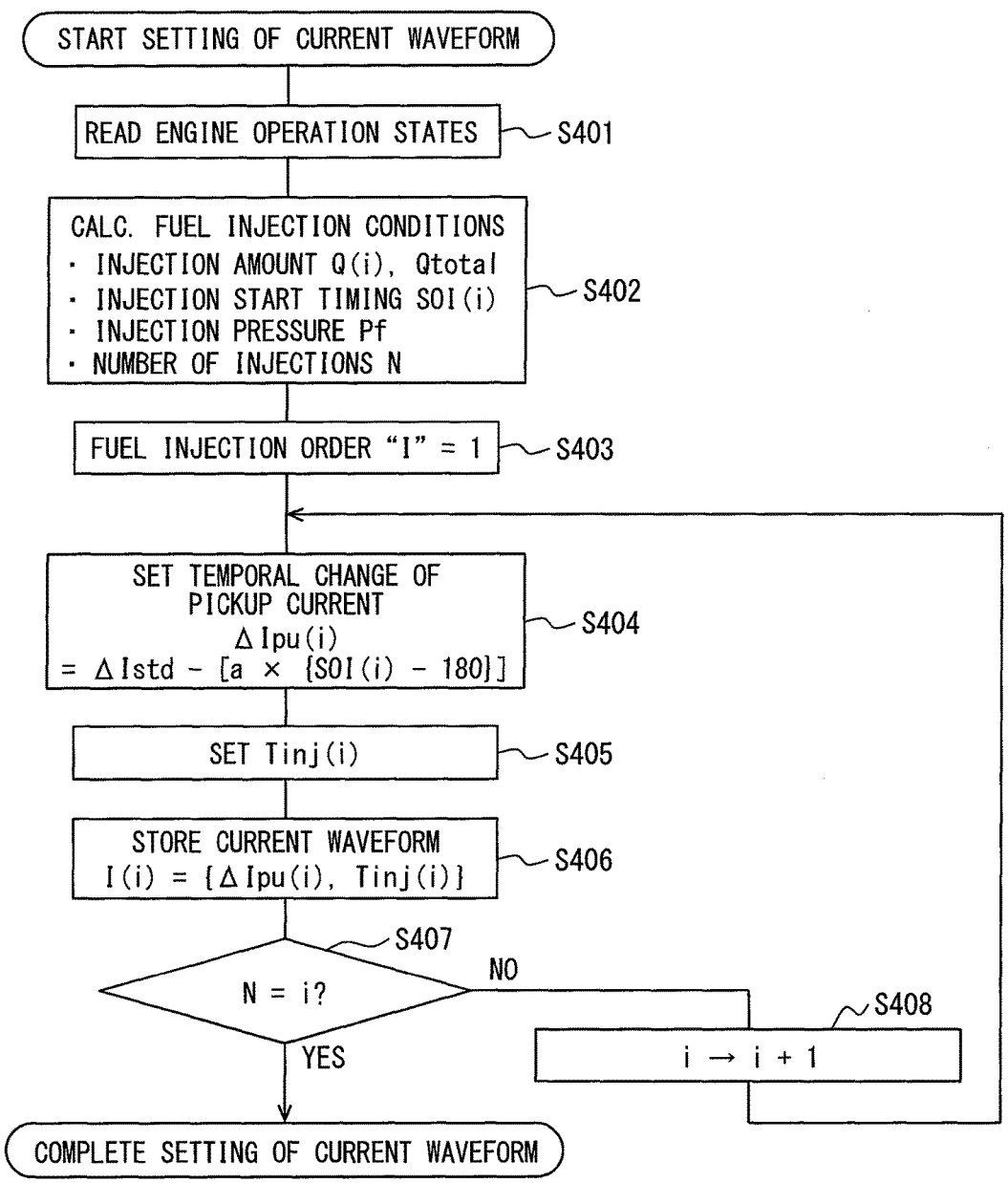
FIG. 12 is a flowchart of a fuel injection control in a fuel injection valve control device according to a fifth embodiment of the present disclosure.

In the fuel injection valve control device according to the fifth embodiment, a current waveform is set for each fuel injection along a flowchart illustrated in FIG. 12.

First, in S401, as in S101 of the first embodiment, an operation state of the engine 11 is read. Next, in S402, the fuel injection conditions of the fuel injection valve 10 are calculated as in S102 of the first embodiment. Then, in S403, as in S103 of the first embodiment, it is confirmed that a current waveform set now is a current waveform of a first fuel injection in one combustion cycle.

Next, in S404, a temporal change ΔIpu(i) of the pickup current in the needle 40 is set. In the fifth embodiment, the temporal change ΔIpu(i) of the pickup current is set through the following Formula (1).

$$\Delta Iup(i) = \Delta Istd - [a \times \{SOI(i) - 180\}] \quad (1)$$

Incidentally, a constant "a" in Formula (1) is an arbitrarily settable coefficient.

After the temporal change ΔIpu(i) of the pickup current is calculated, the process proceeds to S405.

Subsequently, in S405, as in S107 of the first embodiment, an injection command width Tinj(1) is set. Then, in S406, as in S108 of the first embodiment, the information on the current waveform set in S404 and S405 is stored in the ROM, the RAM, or the like as information I(1) on the first fuel injection. Next, in S407, as in S109 of the first embodiment, it is determined whether the current waveform set this time is a current waveform of an N-th fuel injection in the one combustion cycle, or not. When the setting of the current waveform at this time has the number of times smaller than the number of injections N in the one combustion cycle, the process proceeds to S408. In S408, as in S110 of the first embodiment, "1" is added to the order of the fuel injection in which the previous setting of the current waveform is performed, and the process proceeds to S404. When the setting of the current waveform at this time has the same number as the number of injections N in the one combustion cycle, the setting of the current waveform of the fuel injections in the one combustion cycle is completed.

Figure 13:
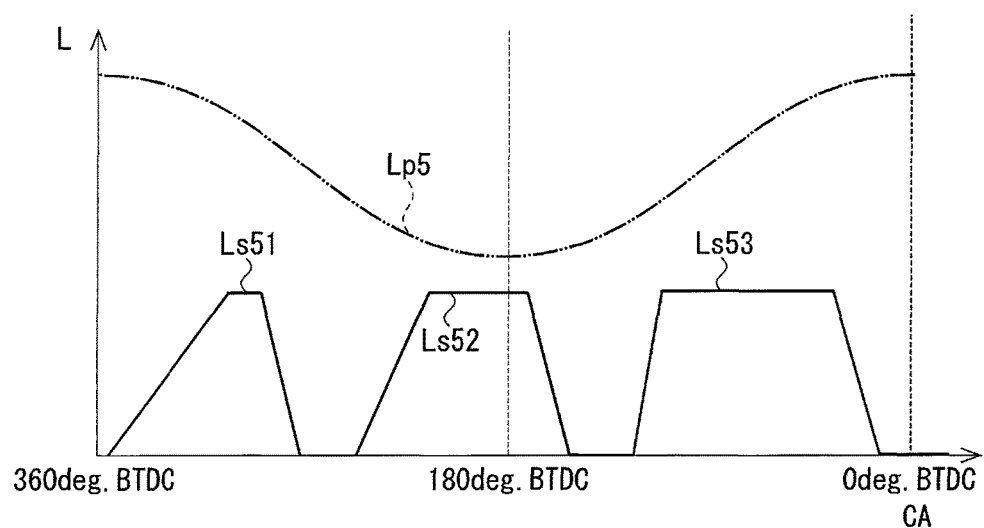
FIG. 13 is a characteristic diagram illustrating a relationship between a crank angle of an engine and a lift amount of a needle according to a fifth embodiment of the present disclosure.

FIG. 13 illustrates a relationship between a crank angle CA of the engine 11 and a lift amount L of the needle 40 in the fuel injection valve 10 according to the fifth embodiment of the present disclosure. In FIG. 13, a position of the piston surface 119 is indicated by a two-dot chain line Lp5. In this example, crank angle changes in the lift amount of the needle 40 when three fuel injections are performed in one combustion cycle are indicated by solid lines Ls51, Ls52, and Ls53. However, the number of fuel injections in the fifth embodiment is not limited to this example. A first fuel injection indicated by the solid line Ls51 corresponds to a "first fuel injection". A third fuel injection indicated by the solid line Ls53 corresponds to a "last fuel injection".

As illustrated in FIG. 13, because the first fuel injection (solid line Ls51 in FIG. 13) is relatively large in the crank angle, a value calculated from a right side of Formula (1) is a relatively small value. As a result, the temporal change ΔIpu(i) of the pickup current becomes relatively small, and in the first fuel injection, the travel speed of the needle 40 in the valve opening direction is relatively low. On the other hand, in the third fuel injection (solid line Ls53 in FIG. 13), because the crank angle is relatively small, a value calculated from the right side of Formula (1) is larger than that in the first fuel injection. As a result, the temporal change ΔIpu(i) of the pickup current is larger than that in the first fuel injection, and in the third fuel injection, the travel speed of the needle 40 in the valve opening operation is higher than that in the first fuel injection. In addition, in the second fuel injection (solid line Ls52 in FIG. 13), because the crank angle is a value between the first fuel injection and the third fuel injection, a value calculated from the right side of Formula (1) becomes a value between the first fuel injection and the third fuel injection. As a result, the temporal change ΔIpu(i) of the pickup current becomes a magnitude between the first fuel injection and the third fuel injection, and the travel speed of the needle 40 in the valve opening direction in the second fuel injection is higher than that in the first fuel injection and is lower than that in the third fuel injection.

In the fuel injection valve control device according to the fifth embodiment, the temporal change ΔIpu(i) in the pickup current is changed according to a size of the injection start timing SOI(i). More specifically, the temporal change ΔIpu (i) of the pickup current is more reduced as the injection start timing SOI(i) is more advanced, and the travel speed of the needle 40 in the valve opening direction is decreased. With the above configuration, in the fifth embodiment, the fuel injected by the fuel injection valve 10 is more unlikely to collide with the inner wall of the engine 11 forming the combustion chamber 110. Therefore, the fifth embodiment can obtain the same advantages as those in the first embodiment. The fifth embodiment can further improve the fuel efficiency while further reducing the amount of generated particulate matter with a further reduction in the collision of the fuel with the inner wall of the engine 11 forming the combustion chamber 110.

Sixth Embodiment

Subsequently, a fuel injection valve control device according to a sixth embodiment of the present disclosure will be described with reference to FIGS. 14 and 15. The sixth embodiment is different from the first embodiment in the configuration of the fuel injection valve to be controlled. The substantially same parts as those in the first embodiment are denoted by identical reference numerals or symbols, and their description will be omitted.

Figure 14:
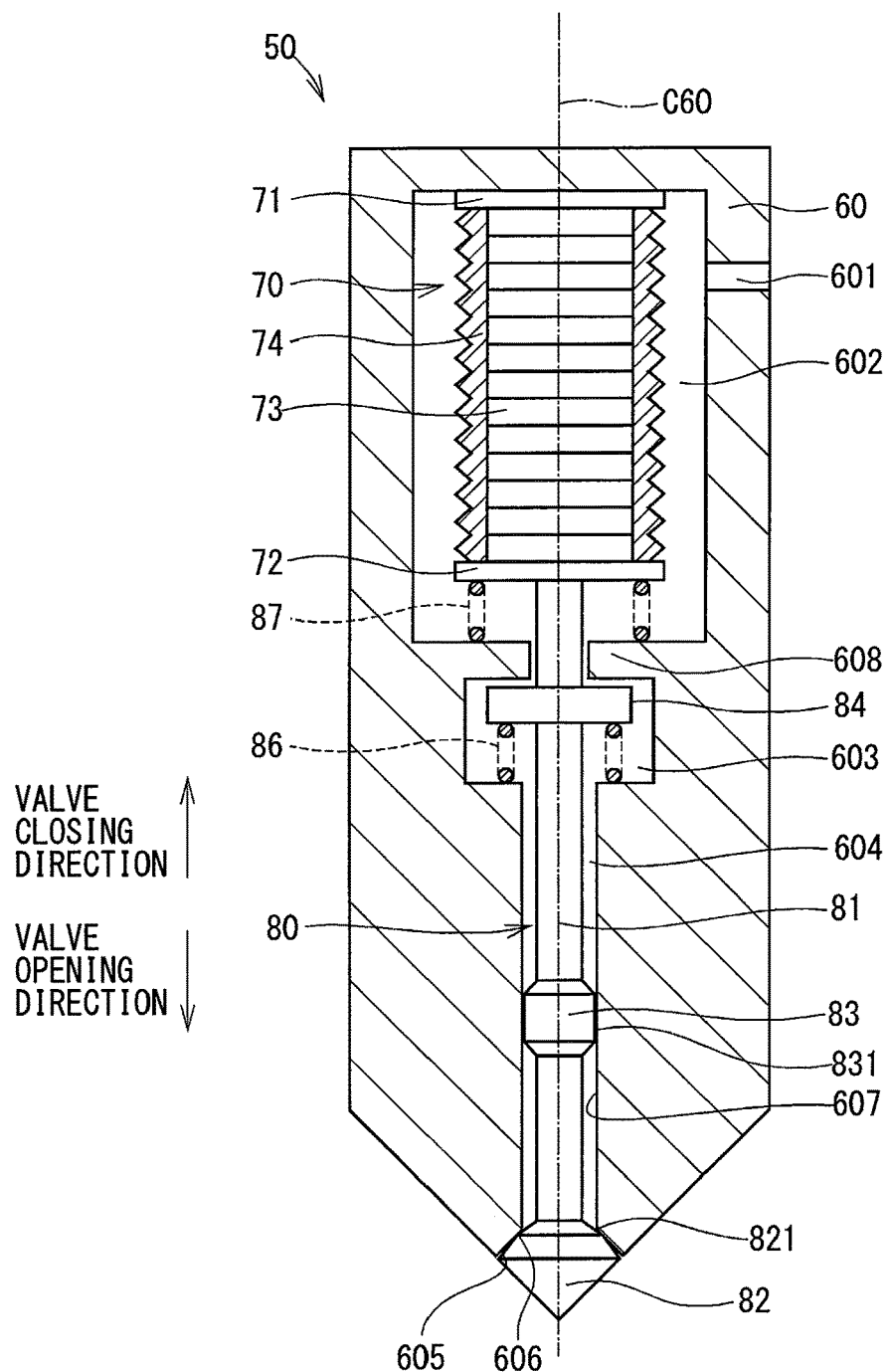
FIG. 14 is a cross-sectional view of a fuel injection valve to be controlled by a fuel injection valve control device according to a sixth embodiment of the present disclosure.

A fuel injection valve 50 to be controlled by a fuel injection valve control device according to the sixth embodiment is illustrated in FIG. 14. The fuel injection valve 50 is a fuel injection valve of an outside opening system in which a seal portion jumps to an outside of a housing to open the valve. The fuel injection valve 50 includes a housing 60, a piezoelectric driver 70 as a "drive portion", a needle 80, and so on. Meanwhile, FIG. 14 illustrates a valve opening direction that is a direction along which a seal portion 82 is separated from a valve seat 606, and a valve closing direction along which the seal portion 82 abuts against the valve seat 606.

The housing 60 is cylindrically formed. The housing 60 includes an inflow port 601, a first fuel passage 602, a back pressure chamber 603, a second fuel passage 604, and injection holes 605. A fuel flowing inside of the housing 60 flows in the inflow port 601, the first fuel passage 602, the back pressure chamber 603, the second fuel passage 604, and the injection holes 605 in the stated order, and is injected and supplied to the combustion chamber 110.

The inflow port 601 communicates an outside of the housing 60 with the first fuel passage 602. The piezoelectric driver 70 is housed in the first fuel passage 602. The needle 80 is accommodated in the back pressure chamber 603, the second fuel passage 604, and the injection holes 605 so as to be reciprocally movable.

The injection holes 605 are formed so that an inner diameter of the injection holes 605 increases from the second fuel passage 604 side toward an outside of the housing 60. An inner wall of the housing 60 forming the injection holes 605 has the valve seat 606 against which the seal portion 82 abuts to be described later.

The piezoelectric driver 70 is formed in a substantially columnar shape. The piezoelectric driver 70 includes a fixed portion 71, a movable portion 72, multiple piezoelectric elements 73, and a bellows 74.

The fixed portion 71 and the movable portion 72 are disposed on both ends of the piezoelectric driver 70. The fixing portion 71 is fixed to an inner wall forming the first fuel passage 602 on a side opposite to the injection hole 605.

The multiple piezoelectric elements 73 are stacked on each other while being sandwiched between the fixed portion 71 and the movable portion 72. When the multiple piezoelectric elements 73 are charged with the application of a voltage, the multiple piezoelectric elements 73 extends in a direction where the fixed part 71 and the movable part 72 move away from each other. On the other hand, when no voltage is applied, the multiple piezoelectric elements 73 contracts in a direction where the fixed portion 71 and the movable portion 72 come closer to each other.

The bellows 74 is disposed so as to cover an outer circumference of the multiple piezoelectric elements 73. The bellows 74 is formed in a bellows shape and is expandable and contractable according to expansion and contraction of the piezoelectric elements 73. One end of the bellows 74 is liquid-tightly joined to the fixed portion 71, and the other end is liquid-tightly joined to the movable portion 72. As a result, the bellows 74 prevents the piezoelectric elements 73 from being exposed to the fuel filling the second fuel passage 604.

The needle 80 has a shaft portion 81, a seal portion 82, a sliding contact portion 83, a flange portion 84, and the like.

The shaft portion 81 is a rod-like member that is housed in the first fuel passage 602, the back pressure chamber 603, and the second fuel passage 604. A side of the shaft portion 81 opposite to injection holes 605 is joined to the movable portion 72. As a result, the shaft portion 81 can reciprocate together with the movable portion 72. The seal portion 82 is provided at an end portion of the shaft portion 81 on the injection holes 605 side.

The seal portion 82 is formed so that an outer diameter of the seal portion 82 increases from an end portion on the shaft portion 81 side toward an end portion on a side opposite to the shaft portion 81. An outer wall 821 on a radially outer side of the seal portion 82 is formed so as to abut against the valve seat 606.

The sliding contact portion 83 is a tubular portion provided on a radially outer side of the shaft portion 81 located in the second fuel passage 604. The outer wall 831 of the sliding contact portion 83 is formed so as to be slidable on an inner wall 607 of the housing 60 forming the second fuel passage 604. With the above configuration, the reciprocating movement of the needle 80 is guided.

The flange portion 84 is an annular portion provided on a radially outer side of the shaft portion 81 located in the back pressure chamber 603. A spring 86 is provided on the injection holes 605 side of the flange portion 84. One end of the spring 86 is supported by the flange portion 84 and the other end of the spring 86 is supported by the inner wall of the back pressure chamber 603. The spring 86 urges the needle 80 in the valve closing direction.

A spring 87 is provided on the piezoelectric driver 70 on the side of the injection holes 605. One end of the spring 87 is supported by the movable portion 72, and the other end of the spring 87 is supported by a partition wall 608 that partitions the first fuel passage 602 and the back pressure chamber 603. The spring 87 urges the piezoelectric driver 70 in the valve closing direction.

In the fuel injection valve 50, when a voltage is applied to the piezoelectric driver 70, the piezoelectric driver 70 extends in a direction of a center axis C60 of the housing 60. In this situation, the needle 80 moves in the valve opening direction according to the extension of the piezoelectric driver 70. When the needle 80 moves in the valve opening direction against a difference between an urging force of the spring 86 and an urging force of the spring 87, the seal portion 82 and the valve seat 606 are separated from each other, and the injection holes 605 are opened. As a result, the fuel filling the second fuel passage 604 is injected into the combustion chamber 110 from the injection holes 605.

If no voltage is applied to the piezoelectric driver 70, the piezoelectric driver 70 contracts in the direction of the central axis C60. In this situation, when the needle 80 moves in the valve closing direction due to the difference between the urging force of the spring 86 and the urging force of the spring 87, the seal portion 82 abuts against the valve seat 606, and the injection holes 605 are closed. As a result, the injection of the fuel from the injection holes 605 is stopped.

In the fuel injection valve control device according to the sixth embodiment, the current waveform is set for each fuel injection along the flowchart of the method for setting the current waveform in the first embodiment (refer to FIG. 3). In this situation, in the fuel injection valve control device according to the sixth embodiment, when the temporal change ΔIpu(i) in the pickup current of the needle 80 is changed in S105 and S106, a magnitude of the peak current Ips in the needle 80 is changed. Hereinafter, the control contents will be described with reference to FIG. 15.

Figure 15:
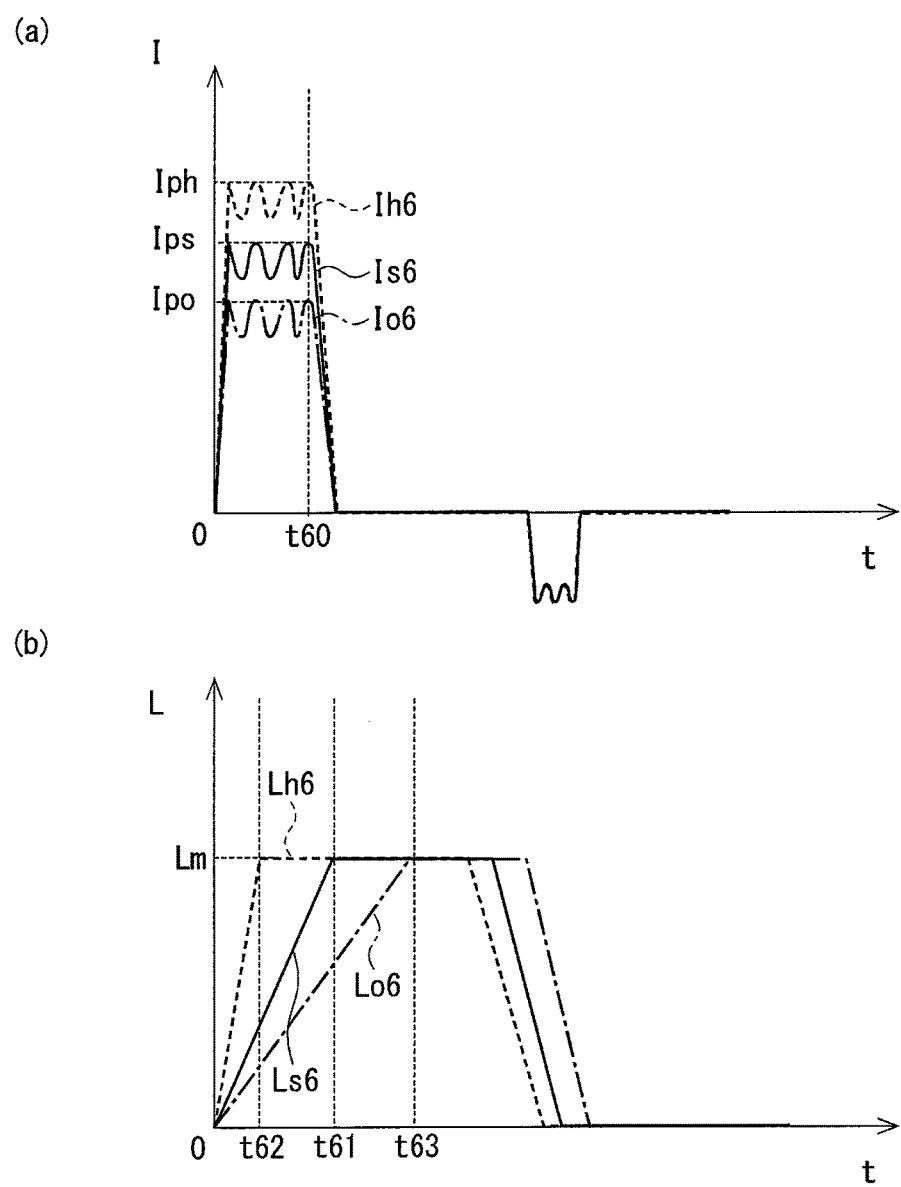
FIG. 15 is a characteristic diagram illustrating a temporal change in a current to be supplied to a drive portion of a fuel injection valve and a lift amount of a needle according to a sixth embodiment of the present disclosure.

FIG. 15(*a*) illustrates a temporal change of the current I to be supplied to the piezoelectric element 73 by the fuel injection control portion 25. In addition, FIG. 15(*b*) illustrates a temporal change of the lift amount of the needle 80 that moves in the valve opening direction.

In the fuel injection valve control device according to the sixth embodiment, as illustrated in FIG. 15(*a*), the fuel injection control portion 25 is disposed so that a maximum value of the pickup current in the needle 80 is changeable. In this example, the "pickup current" of the needle 80 is a current to be supplied to the piezoelectric element 73 for allowing the needle to travel in the valve opening direction from a state in which the fuel injection valve 50 is closed. In FIG. 15(*a*), the pickup current of the needle 80 represents a current flowing since a time "0" until a time t60 at which the maximum current is maintained.

In the sixth embodiment, a solid line Is6 illustrated in FIG. 15(*a*) represents, for example, the temporal change of the current when the injection start timing SOI(i) is 180 degrees BTDC. In the solid line Is6, the current waveform is set so that the current at the time t60 becomes a maximum peak current Ips. The temporal change ΔIpu(i) of the pickup current in this situation is a predetermined reference value ΔIstd. In the sixth embodiment, when the temporal change ΔIpu(i) of the pickup current is the predetermined reference value ΔIstd, the temporal change of the lift amount L of the needle 80 in the fuel injection valve 50 is indicated by a solid line Ls6 illustrated in FIG. 15(b). Since the time "0" until a time t61 at which the lift amount becomes a lift amount Lm that is a maximum lift amount, the travel speed of the needle 80 corresponds to a "reference travel speed".

On the other hand, when the current waveform is set so that the peak current at the time t60 becomes a peak current Iph more than the peak current Ips (dotted line Ih6 in FIG. 15(a)), the temporal change ΔIpu(i) of the pickup current in the needle 80 becomes more than the predetermined reference value ΔIstd as illustrated in FIG. 15(a). As indicated by a dotted line Lh6 in FIG. 15(b), a time until the needle 80 becomes the lift amount Lm becomes a time t62 that is shorter than the time t61 indicated by the solid line Ls6. In other words, the travel speed of the needle 80 is higher than the reference travel speed.

In addition, when the current waveform is set so that the peak current at the time t60 becomes a peak current Ipo less than the peak current Ips (dash-dotted line Io6 in FIG. 15(a)), the temporal change ΔIpu(i) of the pickup current in the needle 80 becomes less than the predetermined reference value ΔIstd as illustrated in FIG. 15(a). As indicated by a dotted line Lo6 in FIG. 15(b), a time until the needle 80 becomes the lift amount Lm becomes a time t63 that is longer than the time t61 indicated by the solid line Ls1. In other words, the travel speed of the needle 80 is lower than the reference travel speed.

In the fuel injection valve control device according to the sixth embodiment, the magnitude of the peak current of the current to be supplied to the piezoelectric element 73 is changed depending on whether the injection start timing SOI(i) is equal to or more than 180 degrees BTDC, or not, thereby being capable of changing the travel speed of the needle 80 in the valve opening direction and changing the spray arrival distance Dinj of the fuel. With the above configuration, similarly, the sixth embodiment for controlling the fuel injection valve 50 including the piezoelectric element 73 as the "drive portion" has the same advantages as those in the first embodiment.

Seventh Embodiment

Next, a fuel injection valve control device according to a seventh embodiment of the present disclosure will be described with reference to FIGS. 16 and 17. The seventh embodiment is different from the third embodiment in that an injection pressure of the fuel is controlled according to a fuel injection start timing. The substantially same parts as those in the third embodiment are denoted by identical reference numerals or symbols, and their description will be omitted.

In the fuel injection valve control device according to the seventh embodiment, the operation of a fuel pump 16 is controlled on the basis of an operation condition of the fuel pump 16 which is set by the fuel-injection setting portion 242 to adjust an injection pressure of the fuel injected by the fuel injection valve 10.

Figure 16:
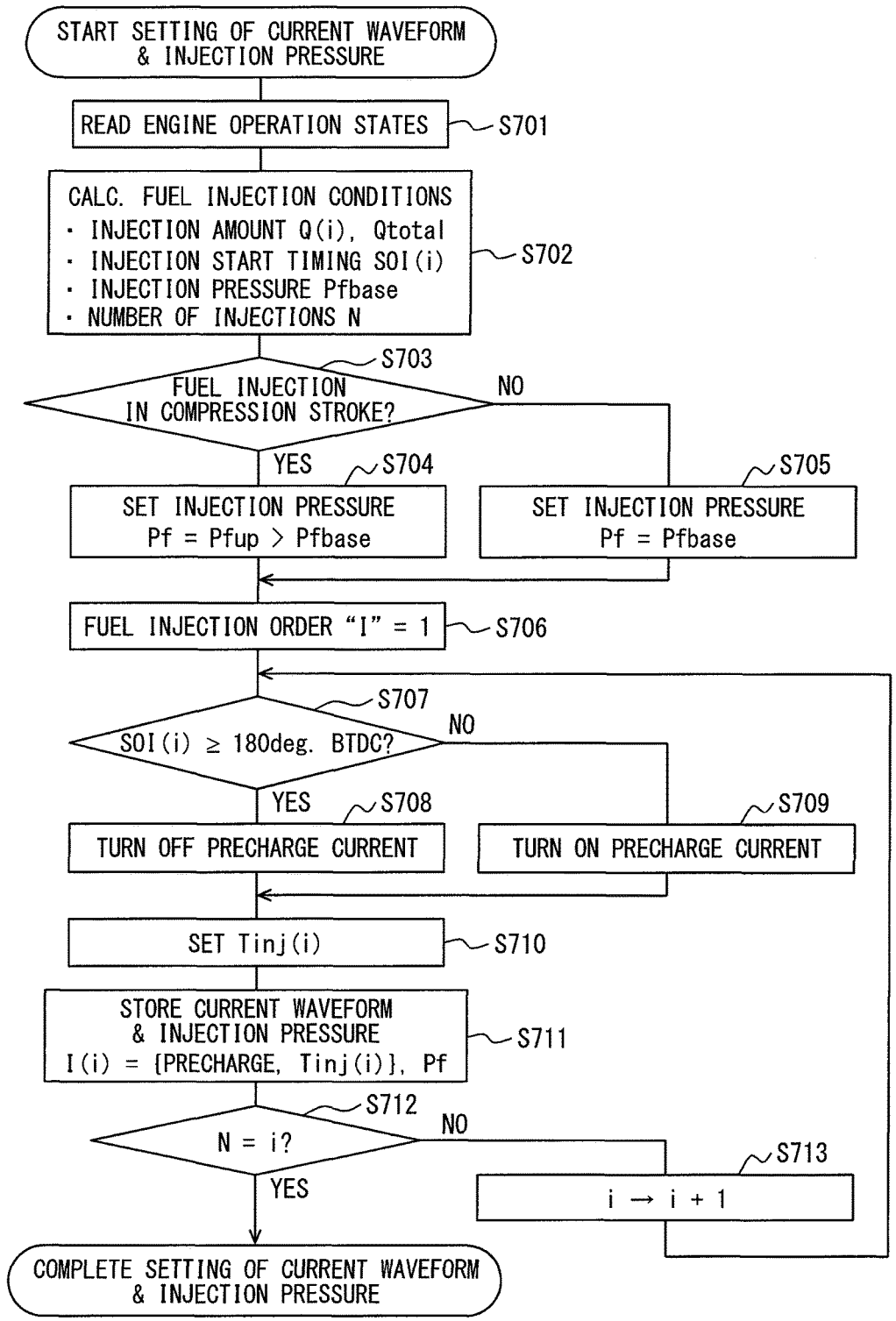
FIG. 16 is a flowchart of a fuel injection control in a fuel injection valve control device according to a seventh embodiment of the present disclosure.

In the fuel injection valve control device according to the seventh embodiment, a current waveform is set for each fuel injection along a flowchart illustrated in FIG. 16.

First, in S701, as in S301 of the third embodiment, an operation state of the engine 11 is read. Next, in S702, the fuel injection conditions of the fuel injection valve 10 are calculated as in S302 of the third embodiment. In this situation, a reference injection pressure Pfbase is calculated as an injection pressure of the fuel.

Next, in S703, it is determined whether a fuel injection in a compression stroke is present in the fuel injections of the combustion cycle of the engine 11 at this time, or not. More specifically, it is determined whether the fuel injection in the compression stroke is present, or not, with reference to the fuel injection conditions calculated in S702. If the fuel injection in the compression stroke is present in the fuel injections in the combustion cycle at this time, the process proceeds to S704. If no fuel injection in the compression stroke is present in a series of fuel injections in the combustion cycle at this time, the process proceeds to S705.

In S704 subsequent to S703, the fuel injection pressure Pf in the combustion cycle at this time is set as a fuel injection pressure Pfup higher than the reference injection pressure Pfbase.

In S705 subsequent to S703, the fuel injection pressure Pf in the combustion cycle at this time is set as a reference fuel injection pressure Pfbase.

Now, a change in the fuel injection pressure Pf in the seventh embodiment will be described with reference to FIGS. 17(a) and 17(b). FIG. 17(a) illustrates a temporal change in the lift amount L of the needle 40 in a valve opening direction by the supply of the current. FIG. 17(b) illustrates a temporal change in the spray arrival distance Dinj of the fuel.

In the fuel injection valve control device according to the seventh embodiment, the pump control portion 252 and the fuel pump 16 are provided so as to change the fuel injection pressure Pf of the fuel injection valve 10.

A solid line Ls7 illustrated in FIG. 17(a) indicates a temporal change in the lift amount L of the needle 40 when there is no fuel injection in the compression stroke. As indicated by the solid line Ls7, the needle 40 is driven so that the lift amount of the needle 40 becomes a maximum lift amount Lms at a time t70.

On the other hand, a solid line Lh7 illustrated in FIG. 17(a) indicates a temporal change in the lift amount L of the needle 40 when there is the fuel injection in the compression stroke. As indicated by the solid line Lh7, the needle 40 is driven so that the lift amount of the needle 40 becomes a lift amount Lmh more than the lift amount Lms at a time t71.

Figure 17:
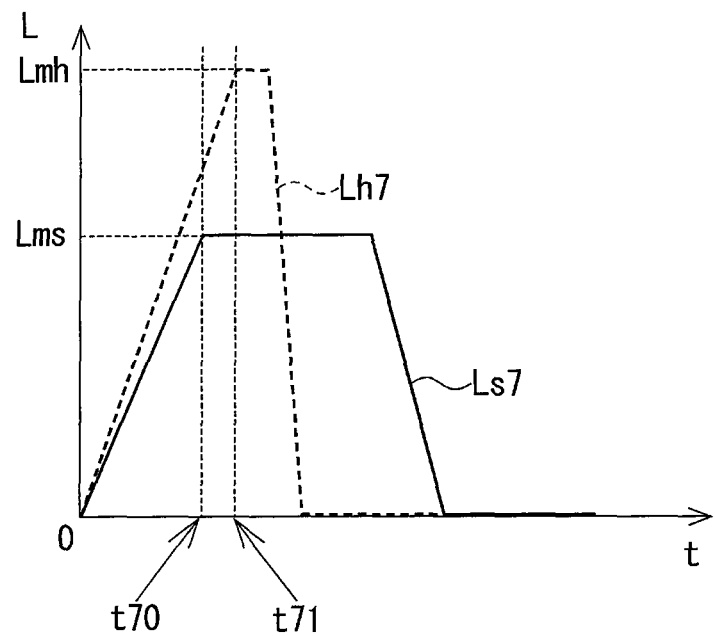
FIG. 17 is a characteristic diagram illustrating a temporal change in a lift amount of a needle of a fuel injection valve and a spray arrival distance in a fuel injection valve according to a seventh embodiment of the present disclosure.
Figure 17:
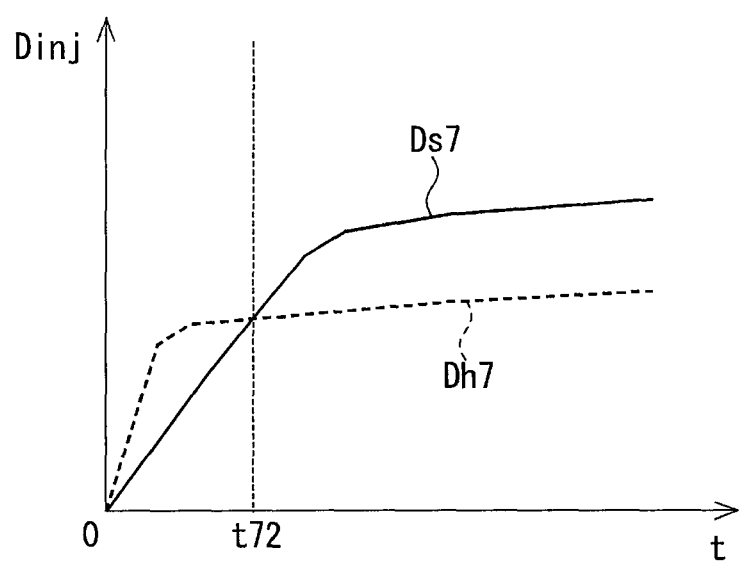

A solid line Ds7 illustrated in FIG. 17(b) indicates a temporal change in the spray arrival distance Dinj of the fuel injection valve 10 when there is no fuel injection in the compression stroke. As compared with the above case, as indicated by a dotted line Dh7 of FIG. 17(b), when the fuel injection pressure Pf is set as a fuel injection pressure Pfup higher than the reference injection pressure Pfbase, the spray arrival distance Dinj becomes longer than the solid line Ds7 immediately after the injection starts (from time "0" to time t72 in FIG. 17). However, after the time t72, the spray arrival distance Dinj becomes shorter than the solid line Ds7.

In this manner, in S704 and S705, the fuel injection pressure Pf is changed on the basis of the determination result in S703.

In S706 subsequent to S704 and S705, as in S303 of the third embodiment, it is confirmed that a current waveform set now is a current waveform of a first fuel injection in one combustion cycle.

Then, in S707, as in S304 of the third embodiment, it is determined whether the injection start timing SOI(i) calculated in S702 is equal to or more than a crank angle 180 degrees BTDC, or not. If the injection start timing SOI(i) calculated in S702 is equal to or more than the 180 degrees BTDC, the process proceeds to S708. If the injection start timing SOI(i) calculated in S702 is less than the 180 degrees BTDC, the process proceeds to S709.

Then, in S708, as in S305 of the third embodiment, the current waveform is set so as to turn off the precharge current. Then, in S709, as in S306 of the third embodiment, the current waveform is set so as to turn ON the precharge current.

In S710 subsequent to S708 and S709, as in S307 of the third embodiment, an injection command width Tinj(i) is set.

Then, in S711, information on the fuel injection pressure Pf set in S704 and S705 as well as information I(i) on the current waveform set in S708, S709, and S710 is stored in the ROM, the RAM, or the like as information on the first fuel injection. Next, in S712, as in S309 of the third embodiment, it is determined whether the current waveform set this time is a current waveform of an N-th fuel injection in the one combustion cycle, or not. When the setting of the current waveform at this time is smaller than the number of injections N in the one combustion cycle, the process proceeds to S713. In S713, as in S310 of the third embodiment, "1" is added to the order of the fuel injection in which the previous setting of the current waveform is performed, and the process proceeds to S607. When the setting of the current waveform at this time has the same number as the number of injections N in the one combustion cycle, the setting of the current waveform of the fuel injections in the one combustion cycle is completed.

In the fuel injection valve control device according to the seventh embodiment, when the fuel injection in the compression stroke is included in a series of fuel injections in the combustion cycle, the fuel injection pressure Pf is set as the fuel injection pressure Pfup which is higher than the reference injection pressure Pfbase. When the fuel injection pressure Pf is increased, because the travel speed of the needle 40 in the valve opening direction is further increased, a period during which the fuel is injected can be shortened. As a result, the spray arrival distance can be further shortened. Therefore, the seventh embodiment can obtain the same advantages as those in the third embodiment, and further improve the fuel efficiency while further reducing the amount of particulate matter produced.

Other Embodiments

In the above embodiment, the "predetermined crank angle" is set to the 180 degrees BTDC corresponding to the bottom dead center between the intake stroke and the compression stroke of the engine. However, the "predetermined crank angle" is not limited to the above configuration.

In the first to third embodiments, the pickup current increases linearly. However, as in the fourth embodiment, the temporal change of the pickup current may be changed.

In the third embodiment, it is assumed that the peak current of the pickup current and the time to reach the peak current are identical with those in the case of the 180 degrees BTDC. However, as in the first and second embodiments, the peak current or the time to reach the peak current may be changed according to the magnitude of the crank angle of the engine.

In the seventh embodiment, the temporal change of the pickup current in the needle is changed according to the presence or absence of precharge. However, the temporal change of the pickup current may be changed by the method of the first embodiment for changing the magnitude of the peak current of the pickup current or the method of the second embodiment for changing the time to reach the peak current.

The present disclosure has been described with reference to embodiments, but it should be noted that the present disclosure is not limited to the embodiments and the structures of the embodiments. The present disclosure includes modifications within the ranges equivalent to various modification embodiments. In addition, the scope and technical range of the present disclosure include certain various combinations and forms and the other combinations and forms obtained by the certain various combinations and forms including a single element, something more than that, or something less than that.

The invention claimed is:

1. A fuel injection valve control device for a fuel injection valve which controls opening and closing of an injection hole of the fuel injection valve including a housing having the injection hole from which a fuel can be injected, a needle that abuts against or separates from a valve seat formed around the injection hole, and a drive portion that drives the needle to separate the needle and the valve seat from each other when a current is supplied to the drive portion, the fuel injection valve control device comprising:

an operation-state detection portion that detects an operation state of an internal combustion engine having a combustion chamber into which the fuel injection valve injects the fuel;

an injection-condition calculation portion that calculates a fuel injection condition of the fuel injection value on the basis of the operation state of the internal combustion engine detected by the operation-state detection portion;

a current-waveform setting portion that sets a current waveform of a current to be supplied to the drive portion on the basis of the fuel injection condition calculated by the injection-condition calculation portion to set a travel speed of the needle in a valve opening direction to be equal to or lower than a reference travel speed when a crank angle of the internal combustion engine is equal to more than a predetermined crank angle, and to set the travel speed of the needle in the valve opening direction to be higher than the reference travel speed when the crank angle of the internal combustion engine is less than the predetermined crank angle; and a current supply portion that supplies the current to the drive portion on the basis of the current waveform set by the current-waveform setting portion.

2. The fuel injection valve control device according to claim 1, wherein
the predetermined crank angle is a crank angle at a bottom dead center between an intake stroke and a compression stroke of the internal combustion engine.

3. The fuel injection valve control device according to claim 1, wherein
the current-waveform setting portion sets a current waveform to decrease a travel speed of the needle in the valve opening direction more as a fuel injection start timing of the fuel injection valve is more advanced.

4. The fuel injection valve control device according to claim 1, wherein
when the fuel injection valve performs a plurality of fuel injections in one combustion cycle of the internal combustion engine, the current-waveform setting portion sets the current waveform to decrease the travel speed of the needle in the valve opening direction in a first fuel injection of the one combustion cycle more than the travel speed of the needle in the valve opening direction in the fuel injections after the first fuel injection, and sets the current waveform to increase the travel speed of the needle in the valve opening direction in a last fuel injection of the one combustion cycle more than the travel speed of the needle in the valve opening direction in the fuel injections before the last fuel injection.

5. The fuel injection valve control device according to claim 1, wherein
the current-waveform setting portion sets a current waveform to supply a current that can maintain a state in which the needle abuts against the valve seat before the current is supplied to the drive portion to separate the needle and the valve seat from each other.

6. The fuel injection valve control device according to claim 1, wherein
the current-waveform setting portion can set a current waveform that changes at least one of a peak current value that is a current value when a lift amount of the needle is maximized and a time until a current value of the current to be supplied to the drive portion reaches the peak current value.

7. The fuel injection valve control device according to claim 1, wherein
the current-waveform setting portion can set a current waveform that changes a temporal change of the current value until a current value of the current to be supplied to the drive portion reaches a peak current value which is a current value when a lift amount of the needle is maximized.

8. The fuel injection valve control device according to claim 1, further comprising:
an injection-pressure changing portion that can change an injection pressure of the fuel injected by the fuel injection valve, wherein
when the injection-condition calculation portion calculates the fuel injection condition under which the fuel injection valve injects the fuel in a compression stroke of the internal combustion engine, the injection pressure change portion sets the injection pressure of the fuel injected by the fuel injection valve to be higher than the injection pressure of the fuel injected by the fuel injection valve in a cycle where the fuel is injected in only another stoke except for the compression stroke.

* * * * *